US012519192B2

(12) United States Patent
Long et al.

(10) Patent No.: US 12,519,192 B2
(45) Date of Patent: Jan. 6, 2026

(54) BATTERY INCLUDING INSULATION PIECE HAVING DRAINAGE GROOVE AND ELECTRICAL DEVICE INCLUDING THE SAME

(71) Applicant: Contemporary Amperex Technology (Hong Kong) Limited, Hong Kong (CN)

(72) Inventors: Chao Long, Fujian (CN); Xingdi Chen, Fujian (CN); Peng Wang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/060,826

(22) Filed: Feb. 24, 2025

(65) Prior Publication Data
US 2025/0233292 A1 Jul. 17, 2025

Related U.S. Application Data

(63) Continuation of application No. PCT/CN2023/078416, filed on Feb. 27, 2023.

(51) Int. Cl.
*H01M 50/593* (2021.01)
*H01M 50/342* (2021.01)
(Continued)

(52) U.S. Cl.
CPC ..... *H01M 50/593* (2021.01); *H01M 50/3425* (2021.01); *H01M 50/507* (2021.01); *H01M 50/588* (2021.01); *H01M 50/627* (2021.01)

(58) Field of Classification Search
CPC ............. H01M 50/533; H01M 50/107; H01M 50/152; H01M 50/169
See application file for complete search history.

(56) References Cited

U.S. PATENT DOCUMENTS

2013/0309534 A1* 11/2013 Suzuki ................ H01M 50/553
429/94
2022/0006164 A1* 1/2022 Egashira ............. H01M 50/264
2022/0045387 A1 2/2022 Taniuchi et al.

FOREIGN PATENT DOCUMENTS

CN 210897362 U 6/2020
CN 111952515 A 11/2020
(Continued)

OTHER PUBLICATIONS

CN 113823882 English Translation (Year: 2021).*
(Continued)

*Primary Examiner* — Jimmy Vo
(74) *Attorney, Agent, or Firm* — XSENSUS LLP

(57) ABSTRACT

This application provides a battery and an electrical device. The battery includes a battery cell, a busbar, and an insulation piece. The battery cell includes a shell and an electrode terminal. The shell includes a first wall. The electrode terminal is disposed on the first wall. The busbar is electrically connected to the electrode terminal. The insulation piece is disposed on one side, facing the electrode terminal, of the busbar and covers at least a part of the first wall. The insulation piece includes a first groove recessed along a direction facing away from the first wall. In the battery and electrical device, the first groove is available for accommodating an electrolyte solution leaking from a battery cell.

19 Claims, 9 Drawing Sheets

(51) Int. Cl.
*H01M 50/507* (2021.01)
*H01M 50/588* (2021.01)
*H01M 50/627* (2021.01)

(56) References Cited

FOREIGN PATENT DOCUMENTS

| | | | | |
|---|---|---|---|---|
| CN | 112542637 A | | 3/2021 | |
| CN | 113823882 A | * | 12/2021 | .......... H01M 50/317 |
| CN | 115377590 A | | 11/2022 | |
| CN | 115498345 A | | 12/2022 | |
| JP | 2012-079512 A | | 4/2012 | |

OTHER PUBLICATIONS

International Search Report and Written Opinion mailed on Oct. 23, 2023, received for PCT Application PCT/CN2023/078416, filed on Feb. 27, 2023, 8 pages including English Translation.
Extended European Search Report issued Aug. 4, 2025 in European Patent Application No. 23924517.8.

* cited by examiner

BATTERY INCLUDING INSULATION PIECE HAVING DRAINAGE GROOVE AND ELECTRICAL DEVICE INCLUDING THE SAME

CROSS-REFERENCE TO RELATED APPLICATION

This application is a continuation of international application No. PCT/CN2023/078416, filed on Feb. 27, 2023, which is incorporated herein by reference in its entirety.

TECHNICAL FIELD

This application relates to the field of battery technology, and in particular, to a battery and an electrical device.

BACKGROUND

Batteries are widely used in electronic devices such as a mobile phone, a notebook computer, an electric power cart, an electric vehicle, an electric airplane, an electric ship, an electric toy car, an electric toy ship, an electric toy airplane, and an electric tool. The battery cells may include a nickel-cadmium battery cell, a nickel-hydrogen battery cell, a lithium-ion battery cell, a secondary alkaline zinc-manganese battery cell, and the like.

In the development of battery technology, it is essential to improve the reliability of a battery in addition to the battery performance. Improving the reliability of the battery is of great significance to energy conservation. Therefore, how to improve the reliability of a battery is a persistent technical challenge in the battery technology.

SUMMARY

This application provides a battery and an electrical device to improve the reliability of the battery.

According to a first aspect, an embodiment of this application provides a battery. The battery includes a battery cell, a busbar, and an insulation piece. The battery cell includes a shell and an electrode terminal. The shell includes a first wall. The electrode terminal is disposed on the first wall. The busbar is electrically connected to the electrode terminal. The insulation piece is disposed on one side, facing the electrode terminal, of the busbar and covers at least a part of the first wall. The insulation piece includes a first groove recessed along a direction facing away from the first wall.

In the battery according to this embodiment of this application, the insulation piece is disposed on one side, facing the electrode terminal, of the busbar, and the insulation piece includes a first groove that is recessed along the direction facing away from the first wall. In a case that the electrode terminal of the battery cell is placed downward along a gravity direction, when the electrolyte solution in the battery cell leaks, the electrolyte solution falls onto the insulation piece under the action of gravity and flows into the first groove along a surface of the insulation piece on one side close to the first wall. In this way, the first groove is available for accommodating the electrolyte solution leaking from the battery cell, thereby reducing the risk that the electrolyte solution electrically connects two adjacent busbars and causes a high-voltage short circuit inside the battery, and in turn, improving reliability of the battery.

In some embodiments, the insulation piece includes a second wall facing a side on which the first wall is located. The second wall is disposed around at least a part of the first groove. The second wall is inclined toward the first wall from a circumference of the first groove outward. Such an arrangement makes it convenient for the electrolyte solution leaking from the battery cell to flow into the first groove in a timely and rapid manner, thereby further reducing the risk that the electrolyte solution electrically connects two adjacent busbars, and improving the reliability of the battery.

In some embodiments, the battery includes a plurality of the battery cells. The insulation piece is provided with a plurality of the first grooves. The first wall of each battery cell is disposed opposite to at least one first groove. In such an arrangement, the electrolyte solution leaking from the joint between the first wall of each battery cell and the electrode terminal can flow into the opposite first groove along a relatively short path, thereby further reducing the risk that the electrolyte solution electrically connects two adjacent busbars and causes a high-voltage short circuit inside the battery.

In some embodiments, at least two first grooves are disposed corresponding to the first wall. The at least two first grooves include two first grooves disposed corresponding to diagonal corners of the first wall respectively. When the battery is tilted, the electrolyte solution leaking from the battery cell can flow into the corresponding first groove, thereby further improving the smoothness of the electrolyte solution flowing into the first groove, and reducing the probability of the electrolyte solution electrically connecting two adjacent busbars.

In some embodiments, at least four first grooves are disposed corresponding to the first wall. The at least four first grooves include four first grooves disposed corresponding to two pairs of diagonal corners of the first wall respectively. When the battery is tilted, such an arrangement further improves the smoothness of the electrolyte solution flowing into the first groove, and further reduces the probability of the electrolyte solution electrically connecting two adjacent busbars.

In some embodiments, the first groove includes a first drain hole. The first drain hole runs through a bottom wall of the first groove. The electrolyte solution in the first groove can be expelled promptly through the first drain hole, thereby further reducing the risk that the electrolyte solution electrically connects two adjacent busbars and causes a high-voltage short circuit inside the battery.

In some embodiments, the first groove includes a first sidewall extending along a first direction and a second sidewall extending along a second direction. The first sidewall is connected to the second sidewall. Both the first sidewall and the second sidewall are connected to an outer periphery of the bottom wall of the first groove. A dimension of the first sidewall along a thickness direction of the first wall is $h_1$, and a minimum distance between an edge of the first drain hole and the first sidewall along the second direction is $w_1$, satisfying: $w_1 \leq 5.67 h_1$; and/or, a dimension of the second sidewall along a thickness direction of the first wall is $h_2$, and a minimum distance between an edge of the first drain hole and the second sidewall along the first direction is $w_2$, satisfying: $w_2 \leq 2.74 h_2$. The first direction, the second direction, and the thickness direction of the first wall intersect each other. In this way, when the battery tilts by 10° or less along the second direction and/or by 20° or less along the first direction, the electrolyte solution leaking from the battery cell can still be expelled through the first drain hole, thereby reducing the risk of the electrolyte solution electrically connecting two adjacent busbars when the battery is tilted.

In some embodiments, the first groove includes a plurality of the first drain holes. The plurality of first drain holes are spaced apart. Such an arrangement is conducive to increasing the speed of expelling the electrolyte solution in the first groove. When the bottom wall of the first groove tilts relative to the horizontal direction, the electrolyte solution can be expelled through the first drain hole located at a relatively low position after tilting, thereby making it more convenient to expel the electrolyte solution in the first groove promptly, and reducing the risk of the electrolyte solution electrically connecting two adjacent busbars.

In some embodiments, at least one first drain hole is disposed at a corner of the first groove. When the battery tilts in a corresponding direction, the first drain hole is located at a relatively low position of the first groove, thereby making it convenient to expel the electrolyte solution in the first groove promptly through the first drain hole.

In some embodiments, the insulation piece further includes a guide groove, and the guide groove is connected to the first groove. When dripping onto the insulation piece, the electrolyte solution leaking from the battery cell can flow into the guide groove first, and then flow into the first groove through the guide groove. In this way, it is convenient for the electrolyte solution leaking from the battery cell to flow into the first groove more promptly.

In some embodiments, the battery cell further includes a pressure relief mechanism. The pressure relief mechanism is disposed on the first wall. An orthographic projection of the pressure relief mechanism on the insulation piece along a thickness direction of the first wall at least partially lies within the guide groove. Such an arrangement makes it convenient for the electrolyte solution leaking from the pressure relief mechanism to flow into the first groove promptly, thereby further reducing the probability that the electrolyte solution leaking from the battery cell electrically connects two adjacent busbars.

In some embodiments, along the thickness direction of the first wall, the orthographic projection of the pressure relief mechanism on the insulation piece lies within the guide groove. A minimum distance between an edge of the orthographic projection of the pressure relief mechanism on the insulation piece and a sidewall of the guide groove is a, and, along the thickness direction of the first wall, a minimum distance between the pressure relief mechanism and the guide groove is $h_3$, satisfying: $a \geq 0.36h_3$. When the battery tilts by less than 20°, such an arrangement increases the probability that the electrolyte solution leaking from the pressure relief mechanism drips into the guide groove, thereby further improving the reliability of the battery.

In some embodiments, the guide groove is recessed along a direction facing away from the first wall. Along a thickness direction of the first wall, a dimension of the guide groove is less than or equal to a dimension of the first groove. When the electrode terminal of the battery cell is disposed downward along a gravity direction, the bottom wall of the first groove is lower than the bottom wall of the guide groove, thereby making it convenient for the electrolyte solution in the guide groove to flow into the first groove more smoothly.

In some embodiments, the first wall includes an injection port. The injection port is configured to inject an electrolyte solution into the shell. Along a thickness direction of the first wall, an orthographic projection of the injection port on the insulation piece at least partially lies within the guide groove. In this way, it is convenient for the electrolyte solution leaking through the injection port to flow into the first groove promptly through the guide groove.

In some embodiments, the battery cell further includes a pressure relief mechanism. The pressure relief mechanism is disposed on the first wall. The insulation piece includes a second groove recessed along a direction facing away from the first wall. An orthographic projection of the pressure relief mechanism on the insulation piece along a thickness direction of the first wall at least partially lies within the second groove. In this way, the electrolyte solution leaking from the battery cell through the pressure relief mechanism at least partially flows into the second groove directly and is stored in the second groove, thereby further reducing the risk that the electrolyte solution leaking from the battery cell electrically connects two adjacent busbars, and improving the reliability of the battery.

In some embodiments, the second groove includes a second drain hole, and the second drain hole runs through a bottom wall of the second groove. The second drain hole is disposed to expel the electrolyte solution in the second groove promptly, thereby further reducing the risk that the electrolyte solution electrically connects two adjacent busbars and causes a high-voltage short circuit inside the battery.

In some embodiments, the insulation piece further includes a communicating channel, and the communicating channel connects the first groove and the second groove. In this way, the first groove and the second groove can accommodate more electrolyte solution, thereby further reducing the risk of the electrolyte solution electrically connecting two adjacent busbars.

In some embodiments, the battery includes a plurality of the battery cells. The plurality of battery cells are arranged along a first direction. The insulation piece includes at least one first blocking protrusion. The first blocking protrusion extends along a second direction and is located on one side, close to the first wall, of the insulation piece. The second direction intersects the first direction. The first blocking protrusion is located between two first grooves corresponding respectively to the first walls of two battery cells adjacent to each other along the first direction. In this way, once the electrolyte solution leaking from one battery cell drips onto the insulation piece, as blocked by the first blocking protrusion, it is difficult for the leaked electrolyte solution to flow to a region corresponding to the insulation piece on the other battery cell that is adjacent, thereby further reducing the probability that the electrolyte solution electrically connects two adjacent busbars and causes an internal short circuit of the battery.

In some embodiments, a plurality of the battery cells are arranged in a matrix along the first direction and the second direction. The insulation piece includes at least one second blocking protrusion. The second blocking protrusion extends along the first direction and is located on one side, close to the first wall, of the insulation piece. The second blocking protrusion intersects the first blocking protrusion. The second blocking protrusion is located between two first grooves corresponding to the first walls of two battery cells adjacent to each other along the second direction. The second blocking protrusion can limit the flow of electrolyte solution along the second direction, thereby further reducing the probability that the electrolyte solution leaking from the battery cell electrically connects two adjacent busbars, and further improving the reliability of the battery.

In some embodiments, the battery includes a plurality of battery cells. The plurality of battery cells are arranged in a matrix along a first direction and a second direction. The first direction intersects the second direction. The battery further includes at least one insulation spacer. The insulation spacer extends along the first direction. The insulation spacer is disposed between two busbars adjacent to each other along the second direction. The insulation spacer can implement insulative isolation between the two adjacent busbars that are adjacent to each other along the second direction, thereby increasing a creepage distance of the two adjacent busbars, reducing the risk of electrical connection between the two busbars, and improving the reliability of the battery.

In some embodiments, the insulation spacer abuts the first wall of the battery cell and/or the insulation piece. Such an arrangement improves the structural compactness of the battery, and the insulation spacer can further improve the insulation effect between two adjacent busbars.

In some embodiments, the insulation spacer abuts the first walls of two battery cells adjacent to each other along the second direction. In this way, the insulation spacer implements the insulative isolation of the structures such as the electrode terminals between two adjacent battery cells, and at the same time, reduces the amount of the insulation spacer that needs to be used, and reduces the weight of the battery.

In some embodiments, the battery further includes a protection piece. The protection piece is disposed on one side, facing away from the battery cell, of the insulation spacer. The insulation spacer abuts the protection piece. Such an arrangement can increase the electrical clearance and creepage distance inside the battery, thereby further improving the reliability of the battery. The insulation spacer can also increase the overall structural strength of the battery.

In some embodiments, a clearance is provided between the protection piece and the busbar along a thickness direction of the first wall. The clearance between the protection piece and the busbar is used as a deformation clearance space for the protection piece, thereby buffering the deformation of the protection piece to some extent, reducing the risk that an external impact or vibration or another external load damages the busbar, and protecting the busbar to some extent.

In some embodiments, the electrode terminal of the battery cell is disposed downward along a gravity direction. Such an arrangement makes it convenient for the electrolyte solution to flow into the first groove promptly.

According to a second aspect, an embodiment of this application provides an electrical device. The electrical device includes the battery disclosed in any one of the embodiments in the first aspect. The battery is configured to provide electrical energy. The first wall of the battery cell is disposed downward along the gravity direction.

The electrical device according to this embodiment of this application employs the battery according to an embodiment of this application, and therefore, in a case that the electrolyte solution in the battery cell is leaking, the first groove can store the leaking electrolyte solution, thereby reducing the probability that the electrolyte solution electrically connects two adjacent busbars inside the battery and causes a high-voltage short circuit inside the battery, and improving the reliability of the electrical device.

BRIEF DESCRIPTION OF DRAWINGS

To describe the technical solutions of some embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
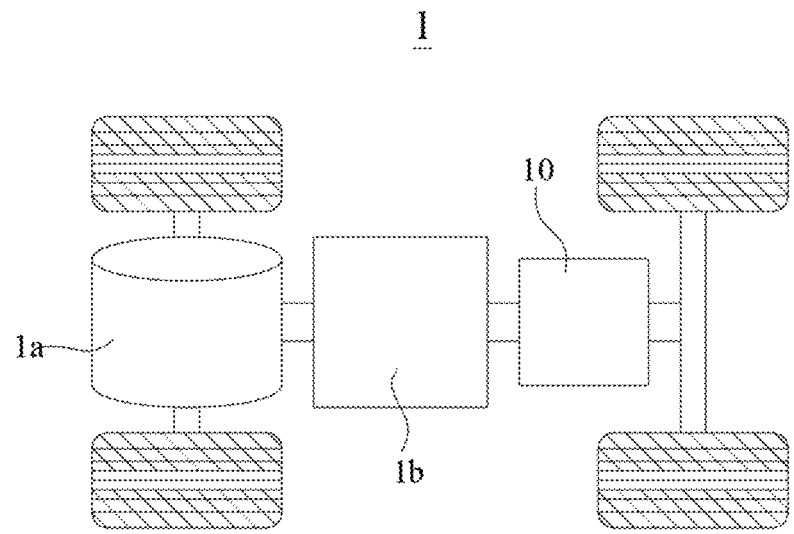
FIG. 1 is a schematic structural diagram of a vehicle according to an embodiment of this application.

LIST OF REFERENCE NUMERALS 1. vehicle; 1a. motor; 1b. controller;
10. battery; 11. first box portion; 12. second box portion;
20. battery module;
30. battery cell; 31. shell; 31a. first wall; 311. housing; 311a. opening; 312. end cap; 32. electrode assembly; 33. electrode terminal; 34. pressure relief mechanism; 35. injection port;
40. busbar;
50. insulation piece; 50a. first groove; 50b. first drain hole; 50c. guide groove; 50d. second groove; 50e. communicating channel; 51d. second drain hole; 51. second wall; 52. first blocking protrusion; 53. second blocking protrusion; 54. first sidewall; 55. second sidewall
60. insulation spacer; 70. protection piece;
M. first direction; N. second direction; O. thickness direction.

DETAILED DESCRIPTION

To make the objectives, technical solutions, and advantages of the embodiments of this application clearer, the following gives a clear description of the technical solutions in some embodiments of this application with reference to the drawings in some embodiments of this application.

Evidently, the described embodiments are merely a part rather than all of the embodiments of this application. All other embodiments derived by a person of ordinary skill in the art based on the embodiments of this application without making any creative efforts still fall within the protection scope of this application.

Unless otherwise defined, all technical and scientific terms used herein have the same meanings as what is normally understood by a person skilled in the technical field of this application. The terms used in the specification of this application are merely intended to describe specific embodiments but not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings herein are intended to distinguish between different items, but are not intended to describe a specific sequence or order of precedence.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art is able to understand the specific meanings of the terms in this application according to specific situations.

As used herein, the term "and/or" indicates merely a relation between related items, and represents three possible relationships. For example, "C and/or D" may represent the following three circumstances: C alone, both C and D, and D alone. In addition, the character "/" herein generally indicates an "or" relationship between the item preceding the character and the item following the character.

In some embodiments of this application, the same reference numeral denotes the same component. For brevity, detailed descriptions of the same component are omitted in a different embodiment. Understandably, dimensions such as thickness, length, and width of various components in some embodiments of this application shown in the drawings, and dimensions such as overall thickness, length, and width of an integrated device are merely illustrative descriptions, but do not constitute any limitation on this application.

"A plurality of" referred to in this application means two or more (including two).

In this application, a battery cell may include a lithium-ion secondary battery cell, a lithium-ion primary battery cell, a lithium-sulfur battery cell, a sodium-lithium-ion battery cell, a sodium-ion battery cell, a magnesium-ion battery cell, or the like. The embodiments of this application do not limit the type of the battery cell. The battery cell may be in various shapes such as cylindrical, flat, cuboidal or other shapes. The shape of the battery cell is not limited herein. In terms of the packaging form, the battery cell is typically classed into three types: cylindrical battery cell, prismatic battery cell, and pouch-type battery cell. The type of the battery cell is not limited herein.

The battery mentioned in embodiments of this application means a unitary physical module that includes one or more battery cells to provide a higher voltage and a higher capacity. For example, the battery mentioned in this application may include a battery module, a battery pack, or the like. A battery typically includes a box configured to package one or more battery cells. The box prevents liquid or other foreign matters from affecting the charging or discharging of the battery cells.

A battery cell includes an electrode assembly and an electrolyte solution. The electrode assembly includes a positive electrode plate, a negative electrode plate, and a separation piece. The battery cell works primarily by shuttling metal ions between the positive electrode plate and the negative electrode plate. The positive electrode plate includes a positive current collector and a positive active material layer. The positive active material layer is coated on a surface of the positive current collector. The positive current collector includes a positive current collecting portion and a positive bulge that protrudes from the positive current collecting portion. The positive current collecting portion is coated with a positive active material layer. At least a part of the positive bulge is not coated with the positive active material layer. The positive bulge serves as a positive tab. Using a lithium-ion battery as an example, the positive current collector may be made of aluminum. The positive active material layer includes a positive active material. The positive active material may be lithium cobalt oxide, lithium iron phosphate, ternary lithium, lithium manganese oxide, or the like. The negative electrode plate includes a negative current collector and a negative active material layer. The negative active material layer is coated on a surface of the negative current collector. The negative current collector includes a negative current collecting portion and a negative bulge that protrudes from the negative current collecting portion. The negative current collecting portion is coated with a negative active material layer. At least a part of the negative bulge is not coated with the negative active material layer. The negative bulge serves as a negative tab. The negative current collector may be made of copper. The negative active material layer includes a negative active material. The negative active material may be carbon, silicon, or the like. To prevent a large electrical current from tripping the circuit, a plurality of positive tabs are stacked together, and a plurality of negative tabs are stacked together. The separation piece may be made of a material such as polypropylene (PP) or polyethylene (PE). In addition, the electrode assembly may be of a jelly-roll type structure or a stacked type structure, without being limited herein.

The applicant systematically analyzed and studied the structure and operating process of batteries after discovering the problem of low reliability of the batteries in use, and has found that battery cells are connected to each other in series and parallel by a busbar, and a busbar or a battery cell shell is insulated and isolated from other structures such as a wiring harness inside the battery by an insulation piece. With the increase of the operating time of the battery, the number of cycles of the battery cells inside the battery increases progressively. Especially, when a battery cell is in an inverted state, the electrolyte solution inside the battery cell is prone to leak and accumulate on the insulation piece inside the battery. With the accumulation of the leaked electrolyte solution of the battery cell, the electrolyte solution is prone to electrically connect two adjacent busbars, thereby posing a risk of a high-voltage short circuit to the battery, and impairing the reliability of the battery severely.

In view of the above problem found by the applicant, the applicant has made improvements to the structure of the battery. The technical solutions disclosed in some embodiments of this application are applicable to a battery and an electrical device that uses a battery.

A battery according to an embodiment of this application includes a battery cell, a busbar, and an insulation piece. The battery cell includes a shell and an electrode terminal. The shell includes a first wall. The electrode terminal is disposed on the first wall. The busbar is electrically connected to the electrode terminal. The insulation piece is disposed on one side, facing the electrode terminal, of the busbar and covers at least a part of the first wall. The insulation piece includes a first groove recessed along a direction facing away from the first wall.

In the battery according to this embodiment of this application, the insulation piece includes a first groove recessed along a direction facing away from the first wall of the battery cell. In this way, once the electrolyte solution leaks at a joint between the electrode terminal of the battery cell and the first wall, the electrolyte solution can be accommodated in the first groove. In this way, with the increase of the leaked electrolyte solution of the battery cell, the electrolyte solution flows to and is accommodated in the first groove, thereby effectively reducing the risk that the electrolyte solution electrically connects two adjacent busbars and causes a high-voltage short circuit inside the battery, and in turn, improving reliability of the battery.

The electrical device may be a vehicle, a mobile phone, a portable device, a notebook computer, a ship, a spacecraft, an electric toy, an electric tool, or the like. The vehicle may be an oil-fueled vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, such as a game console, an electric car toy, an electric ship toy, an electric airplane toy, and the like. The power tool includes an electrical metal cutting tool, an electrical grinding tool, an electrical assembling tool, and a power tool for use in railways. Examples of the power tool are an electrical drill, an electrical grinder, an electrical wrench, an electrical screwdriver, an electrical hammer, an electrical impact drill, a concrete vibrator, an electrical planer, and the like. The electrical device is not particularly limited in embodiments of this application.

For ease of description in the following embodiments, a vehicle is used as an example of the electrical device.

As shown in FIG. 1, a battery 10 is disposed inside the vehicle 1. The battery 10 may be disposed at the bottom, or front, or rear of the vehicle 1. The battery 10 may be configured to supply power to the vehicle 1. For example, the battery 10 may serve as an operating power supply of the vehicle 1.

The vehicle 1 may further include a controller 1b and a motor 1a. The controller 1b is configured to control the battery 10 to supply power to the motor 1a, for example, to meet electrical energy requirements in starting, navigating, or running the vehicle 1.

In some embodiments of this application, the battery 10 serves not only as an operating power supply of the vehicle 1, but may also serve as a driving power supply of the vehicle 1 to provide driving power for the vehicle 1 in place of or partly in place of fuel oil or natural gas.

Figure 2:
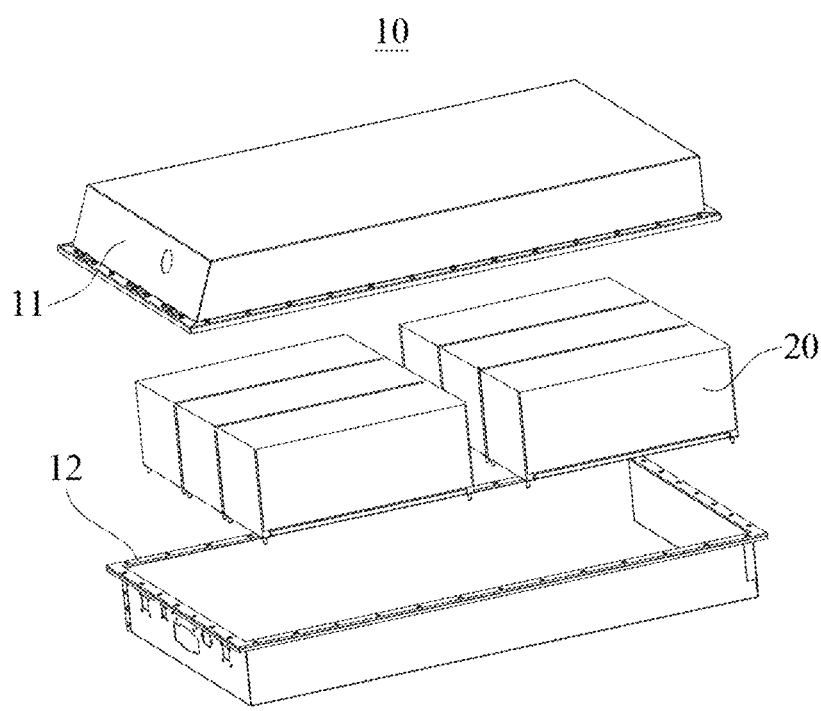
FIG. 2 is a schematic exploded view of a battery according to an embodiment of this application.

Referring to FIG. 2, the battery 10 includes a battery cell (not shown in FIG. 2). The battery 10 may further include a box configured to accommodate the battery cell.

The box is configured to accommodate the battery cell. The box may be in various structural forms. In some embodiments, the box may include a first box portion 11 and a second box portion 12. The first box portion 11 and the second box portion 12 fit and cover each other. The first box portion 11 and the second box portion 12 jointly define an accommodation space for accommodating the battery cell. The second box portion 12 may be a hollow structure opened at one end. The first box portion 11 is a plate structure. The first box portion 11 fits and covers the opening of the second box portion 12 to form a box that offers an accommodation space. Alternatively, the first box portion 11 and the second box portion 12 each may be a hollow structure opened at one end. The opening of the first box portion 11 fits and covers the opening of the second box portion 12 to form the box that offers an accommodation space. Definitely, the first box portion 11 and the second box portion 12 may be in various shapes, such as a cylinder or a cuboid.

To improve hermeticity between the first box portion 11 and the second box portion 12 that are connected together, a sealing element such as a sealing adhesive or a sealing ring may be disposed between the first box portion 11 and the second box portion 12.

Assuming that the first box portion 11 fits and covers the second box portion 12, the first box portion 11 is also referred to as an upper box cover, and the second box portion 12 is also referred to as a lower box body.

The battery 10 may contain one or more battery cells. If there are a plurality of battery cells, the plurality of battery cells are connected in series, parallel, or series-and-parallel pattern. The series-and-parallel pattern means a combination of series connection and parallel connection of the plurality of battery cells. The plurality of battery cells may be directly connected in series, parallel, or series-and-parallel pattern, and then the whole of the plurality of battery cells may be accommodated in the box. Alternatively, the plurality of battery cells may be connected in series, parallel, or series-and-parallel pattern to form a battery module 20 first. A plurality of battery modules 20 are then connected in series, parallel, or series-and-parallel pattern to form a whole for being accommodated in the box.

Figure 3:
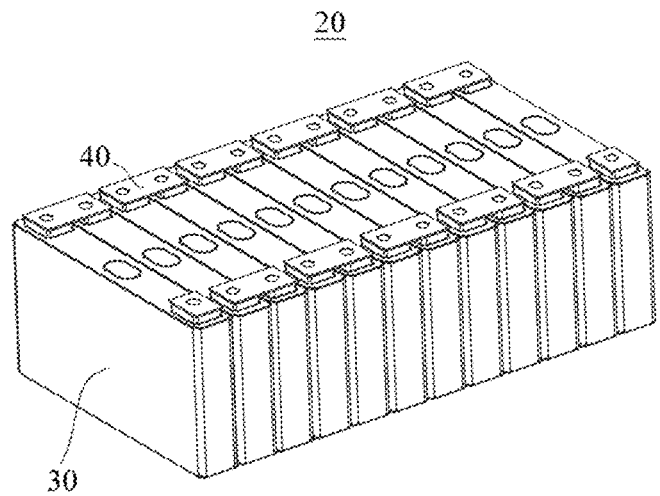
FIG. 3 is a schematic structural diagram of a battery module in a battery according to an embodiment of this application.

In some embodiments, referring to FIG. 3, FIG. 3 is a schematic structural diagram of a battery module 20 shown in FIG. 2. The battery module 20 may contain a plurality of battery cells 30. The plurality of battery cells 30 are connected in series, parallel, or series-and-parallel pattern to form a battery module 20 first. A plurality of battery modules 20 are then connected in series, parallel, or series-and-parallel pattern to form a whole for being accommodated in the box.

In some embodiments, the plurality of battery cells 30 in the battery module 20 may be electrically connected by a busbar 40, so as to implement parallel connection, series connection, or series-and-parallel connection between the plurality of battery cells 30 in the battery module 20.

Figure 4:
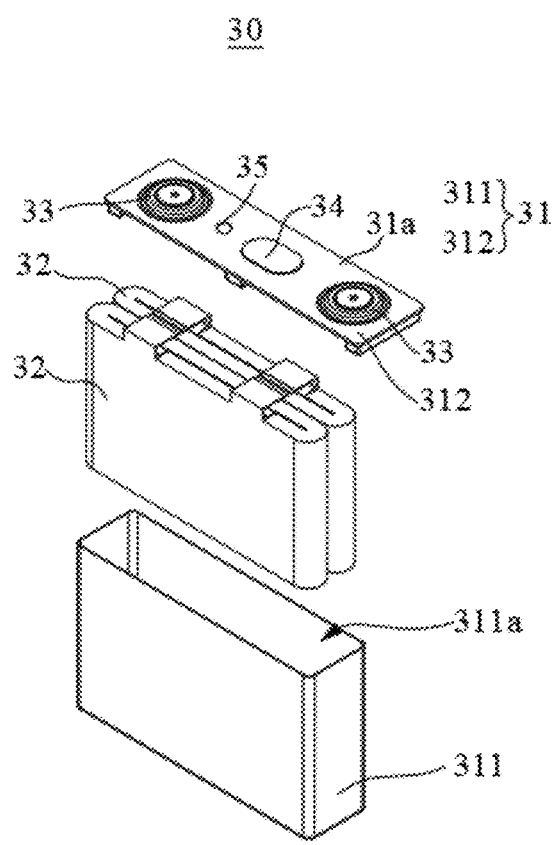
FIG. 4 is a schematic exploded view of a battery cell in a battery according to some embodiments of this application.

Referring to FIG. 4, FIG. 4 is a schematic exploded view of a battery cell 30 shown in FIG. 3. The battery cell 30 according to this embodiment of this application includes an electrode assembly 32 and a shell 31. The shell 31 includes an accommodation cavity. The electrode assembly 32 is accommodated in the accommodation cavity.

In some embodiments, the shell 31 may include a housing 311 and an end cap 312. The housing 311 is a hollow structure opened on one side. The end cap 312 fits on, and is hermetically connected to, the opening 311a of the housing 311, to form a sealed space configured to accommodate the electrode assembly 32 and the electrolyte.

During assembling of the battery cell 30, the electrode assembly 32 may be put into the housing 311 first, and then the end cap 312 fits onto the opening 311a of the housing 311. Subsequently, the electrolyte is injected into the housing 311 through an electrolyte injection port on the end cap 312.

In some embodiments, the shell 31 may be further configured to accommodate an electrolyte such as an electrolyte solution. The shell 31 may assume various structural forms.

FIG. 4 is a schematic structural diagram of a battery cell according to an embodiment of this application.

The housing 311 may be in various shapes such as a cylinder or cuboid. The shape of the housing 311 may be determined depending on the specific shape of the electrode assembly 32. For example, if the electrode assembly 32 is a cylindrical structure, the housing 311 may be a cylindrical structure. If the electrode assembly 32 is a cuboidal structure, the housing 311 may be a cuboidal structure. In FIG. 4, as an example, both the housing 311 and the electrode assembly 32 are a cuboidal structure.

The housing 311 may be made of a variety of materials such as copper, iron, aluminum, stainless steel, or aluminum alloy, without being particularly limited in embodiments of this application.

One or more electrode assemblies 32 may be accommodated in the housing 311. In FIG. 4, two electrode assemblies 32 are accommodated in the housing 311.

In some embodiments, the electrode assembly 32 further includes a positive electrode plate, a negative electrode plate, and a separation piece. The electrode assembly 32 may be a jelly-roll structure formed by winding the positive electrode plate, the separation piece, and the negative electrode plate. The electrode assembly 32 may be a stacked structure formed by stacking the positive electrode plate, the separation piece, and the negative electrode plate.

The positive electrode plate may include a positive current collector and a positive active material layer. The positive active material layer is coated on a surface of the positive current collector. The negative electrode plate may include a negative current collector and a negative active material layer. The negative active material layer is coated on a surface of the negative current collector. The separation piece is disposed between the positive electrode plate and the negative electrode plate, and is configured to separate the positive electrode plate from the negative electrode plate, so as to reduce risks of short circuits between the positive electrode plate and the negative electrode plate.

The tab in the electrode assembly 32 is classed into a positive tab and a negative tab. The positive tab may be a part of the positive current collector, the part being not coated with a positive active material layer. The negative tab may be a part of the negative current collector, the part being not coated with a negative active material layer.

Figure 5:
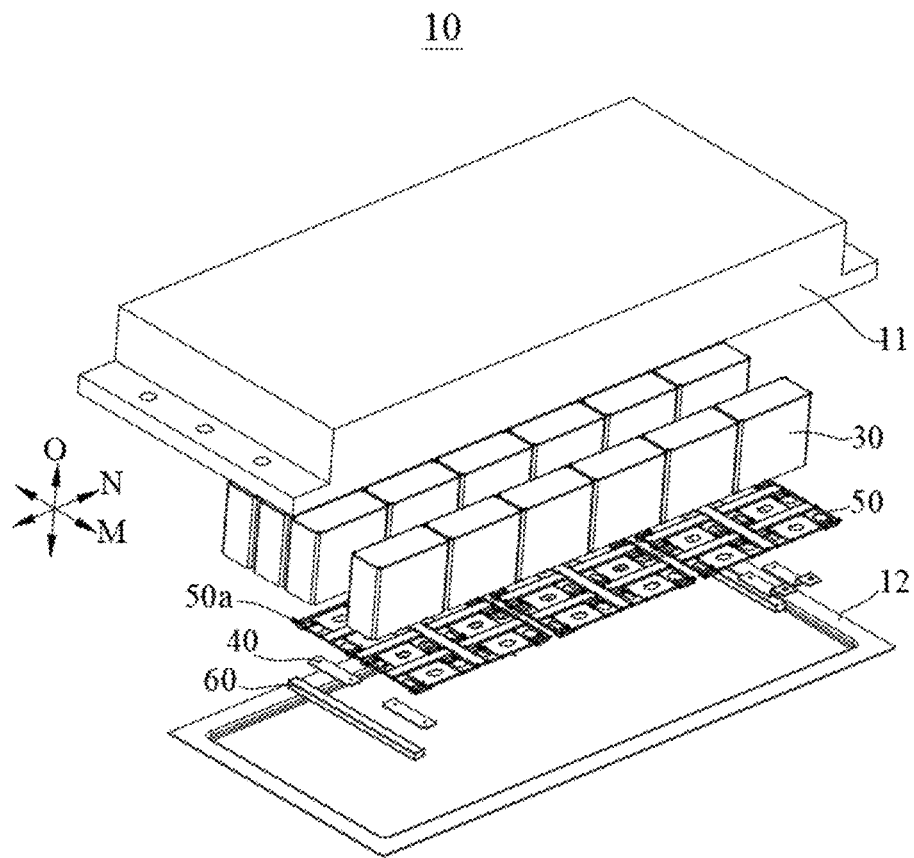
FIG. 5 is a schematic exploded view of a structure of another battery according to an embodiment of this application.

As shown in FIG. 4 and FIG. 5, a battery 10 according to an embodiment of this application includes a battery cell 30, a busbar 40, and an insulation piece 50. The battery cell 30 includes a shell 31 and an electrode terminal 33. The shell 31 includes a first wall 31a. The electrode terminal 33 is disposed on the first wall 31a. The busbar 40 is electrically connected to the electrode terminal 33. The insulation piece 50 is disposed on one side, facing the electrode terminal 33, of the busbar 40 and covers at least a part of the first wall 31a. The insulation piece 50 includes a first groove 50a recessed along a direction facing away from the first wall 31a.

In the battery cell 30, the electrode terminal 33 may be electrically connected to the electrode assembly 32 in the shell 31 of the battery cell 30 to implement cyclic charge and discharge of the electrode assembly 32. The electrode terminal 33 is disposed on the first wall 31a, and therefore, the electrode terminal 33 can be connected to the first wall 31a of the shell 31 by a process such as welding or riveting. When the battery 10 is inverted during operation, the electrode terminal 33 of the battery cell 30 is disposed downward along the gravity direction, and the electrolyte solution inside the battery cell 30 is prone to leak through the joint between the electrode terminal 33 and the first wall 31a, and drip on the insulation piece 50.

Optionally, the shell 31 includes a housing 311 and an end cap 312. The first wall 31a may be a part of the housing 311, or the first wall 31a is at least a part of the end cap 312.

The battery cell 30 may further include a pressure relief mechanism 34. The pressure relief mechanism 34 may be configured to burst when the pressure inside the battery cell 30 reaches a pressure relief threshold, and allow the gas to be expelled out of the battery cell 30. Optionally, the pressure relief mechanism 34 may be disposed on the first wall 31a, or, the pressure relief mechanism 34 may be disposed on another wall, opposite to or adjacent to the first wall 31a, of the shell 31. The mounting position of the pressure relief mechanism may be selected according to actual needs.

The shell 31 of the battery cell 30 may also include an injection port 35. During the manufacture of the battery cell 30, the electrolyte solution is injected into the battery cell 30 through the injection port 35. Optionally, the injection port 35 may be provided on the first wall 31a, or the injection port 35 may be provided on another wall portion, adjacent to or opposite to the first wall 31a, of the shell 31. The position of the injection port may be determined according to actual needs.

The busbar 40 is electrically connected to the electrode terminals 33, and therefore, the busbar 40 can be connected to the electrode terminals 33 of any two battery cells 30, so as to implement series connection or parallel connection between a plurality of battery cells 30.

The insulation piece 50 is disposed on one side, facing the electrode terminal 33, of the busbar 40 and covers at least a part of the first wall 31a, and therefore, the insulation piece 50 covers the busbar 40 and at least a part of the first wall 31a. As an example, the insulation piece 50 covers the entire first wall 31a, so as to reduce the risk of a short circuit between the first wall 31a or the busbar 40 and another electrical structure inside the battery 10.

The insulation piece 50 may be a wiring harness fender inside the battery 10, so as to dielectrically isolate the first wall 31a of the battery cell 30 and the busbar 40 from electrical structures such as a wiring harness on the other side of the insulation piece 50.

The insulation piece 50 includes a first groove 50a recessed along a direction facing away from the first wall 31a. Optionally, the first groove 50a may be formed by injection molding or stamping, or, the first groove 50a may be formed by removing material such as cutting or milling.

When the electrode terminal 33 of the battery cell 30 is placed downward along the gravity direction, the first groove 50a is recessed downward along the gravity direction relative to the remaining region on one side, oriented toward the first wall 31a, of the insulation piece 50. In this way, when the electrolyte solution inside the battery cell 30 leaks and drips onto one side, oriented toward the first wall 31a, of the insulation piece 50 under the action of gravity, the electrolyte solution can drip or flow into the first groove 50a under the action of gravity. The reasonably set number and size of the first grooves 50a enable the first groove 50a to accommodate enough electrolyte solution within the service life of the battery 10, thereby reducing the risk that the electrolyte solution electrically connects two adjacent busbars 40 and causes a high-voltage short circuit inside the battery 10.

Optionally, the number or size of the first grooves 50a on the insulation piece 50 may be set to be large enough to accommodate all the electrolyte solution leaking from the battery cell 30 during the lifespan of the battery 10, or, a related drain channel may be provided to expel the electrolyte solution in the first groove 50a promptly.

Optionally, the insulation piece 50 may include one first groove 50a or a plurality of first grooves 50a. The first groove 50a may be provided at each region, opposite to a battery cell 30 along the thickness direction O of the first wall 31a, on the insulation piece 50; or, the first groove 50a may be provided at a part of regions, opposite to battery cells 30 along the thickness direction O of the first wall 31a, on the insulation piece 50.

Optionally, at least a part of the busbar 40 may be disposed in the first groove 50a. The first groove 50a limits the position of the busbar 40 to some extent.

Optionally, the first wall 31a of one battery cell 30 is disposed opposite to one first groove 50a along the thickness direction O, or, the first wall 31a of one battery cell 30 is disposed opposite to two or more first grooves 50a along the thickness direction O.

Optionally, the first groove 50a is disposed opposite to at least a part of the busbar 40 along the thickness direction O, or, an orthographic projection of the busbar 40 on the insulation piece 50 along the thickness direction O is staggered from the first groove 50a.

The insulation piece 50 is disposed on one side, facing the electrode terminal 33, of the busbar 40, and therefore, the region, opposite to the busbar 40, on the insulation piece 50 can be flush with the remaining region; or, the region, opposite to the busbar 40, on the insulation piece 50 is recessed relative to the remaining region along a direction facing the first wall 31a, thereby making it convenient to position the insulation piece 50 between the busbar 40 and the electrode terminal 33, facilitating the electrical connection between the busbar 40 and the electrode terminal 33, and leaving a specified clearance between the insulation piece 50 and the first wall 31a.

In the battery 10 according to this embodiment of this application, the insulation piece 50 is disposed on one side, facing the electrode terminal 33, of the busbar 40, and the insulation piece 50 includes a first groove 50a that is recessed along the direction facing away from the first wall 31a. In a case that the electrode terminal 33 of the battery cell 30 is placed downward along a gravity direction, when the electrolyte solution in the battery cell 30 leaks, the electrolyte solution falls onto the insulation piece 50 under the action of gravity and flows into the first groove 50a along a surface of the insulation piece 50 on one side close to the first wall 31a. In this way, the first groove 50a is available for accommodating the electrolyte solution leaking from the battery cell 30, thereby reducing the risk that the electrolyte solution electrically connects two adjacent busbars 40 and causes a high-voltage short circuit inside the battery 10, and in turn, improving reliability of the battery 10.

In some embodiments, the insulation piece 50 includes a second wall 51 facing a side on which the first wall 31a is located. The second wall 51 is disposed around at least a part of the first groove 50a. The second wall 51 is inclined toward the first wall 31a from a circumference of the first groove 50a outward.

Optionally, the second wall 51 may be inclined along a plane or inclined along a curved surface, depending on actual needs.

The second wall 51 of the insulation piece 50 is disposed toward the first wall 31a of the shell 31, and the second wall 51 is disposed around at least a part of the first groove 50a, and therefore, the second wall 51 may be disposed around all or part of the first groove 50a. From the circumference of the second wall 51 outward, the second wall 51 is inclined toward the first wall 31a. In other words, the farther the second wall 51 is from the first groove 50a, the closer the second wall is to the first wall 31a. In this way, when the electrode terminal 33 of the battery cell 30 is disposed downward along the gravity direction, the first groove 50a is located at the lowest position of the insulation piece 50 along the gravity direction. After dripping onto the second wall 51, the electrolyte solution in the battery cell 30 slides down toward the first groove 50a along the second wall 51 under the action of gravity, and finally flows into the first groove 50a.

Therefore, from the circumference of the first groove 50a outward, the second wall 51 of the insulation piece 50 is inclined toward the first wall 31a, thereby making it convenient for the electrolyte solution leaking from the battery cell 30 to flow into the first groove 50a in a timely and rapid manner, and in turn, further reducing the risk that the electrolyte solution electrically connects two adjacent busbars 40, and improving the reliability of the battery 10.

Still referring to FIG. 4 and FIG. 5, in some embodiments, the battery 10 includes a plurality of battery cells 30. The insulation piece 50 is provided with a plurality of the first grooves 50a. The first wall 31a of each battery cell 30 is disposed opposite to the first groove 50a.

Optionally, the first wall 31a of each battery cell 30 may be disposed opposite to one, two, or more first grooves 50a. The first groove 50a may be disposed opposite to any region of the first wall 31a, depending on actual needs.

In this way, at least a part of the first wall 31a of each battery cell 30 is disposed opposite to the insulation piece 50 along the thickness direction O, and an orthographic projection of the first wall 31a of each battery cell 30 on the insulation piece 50 along the thickness direction O at least partially lies within the first groove 50a.

In this way, the electrolyte solution leaking from the joint between the first wall 31a of each battery cell 30 and the electrode terminal 33 can flow into the opposite first groove 50a along a relatively short path, thereby further reducing the risk that the electrolyte solution electrically connects two adjacent busbars 40 and causes a high-voltage short circuit inside the battery 10.

As shown in FIG. 4, FIG. 5, FIG. 6, and FIG. 7, in some embodiments, at least two first grooves 50a are disposed corresponding to the first wall 31a. The at least two first grooves 50a include two first grooves 50a disposed corresponding to diagonal corners of the first wall 31a respectively.

When at least two first grooves 50a are disposed corresponding to the first wall 31a, one first wall 31a is disposed opposite to two, three, or more first grooves 50a along the thickness direction O.

The at least two first grooves 50a include two first grooves 50a disposed corresponding to the diagonal corners of the first wall 31a respectively, so that a region, opposite to the first wall 31a of the battery cell 30, on the insulation piece 50 includes diagonal corners opposite to each other. At least two first grooves 50a are located at the diagonal corners, opposite to the first wall 31a, on the insulation piece 50. In other words, at least two first grooves 50a are disposed corresponding to the two opposite diagonal corners of the first wall 31a.

As an example, the first wall 31a includes a first side extending along the first direction M and a second side extending along the second direction N. The first side intersects the second side. At least one first groove 50a is located inside a region enclosed by the first side and the second side that intersect each other, and is disposed near an intersection point between the first side and the second side. In this way, at least two first grooves 50a are disposed diagonally. Therefore, among the two first grooves 50a, one is located on one side of the first wall along the first direction M and one side of the first wall along the second direction N relative to the first wall 31a, and the other is located on the other side of the first wall along the first direction M and the other side of the first wall along the second direction N relative to the first wall 31a. In other words, at least two first grooves 50a are not arranged along the first direction M or the second direction N, but are arranged along a direction that intersects both the first direction M and the second direction N.

Understandably, during the operation of the battery 10, the first wall 31a or the insulation piece 50 is not always in a horizontal state, but may tilt. At least two first grooves 50a are provided, including two first grooves 50a that are disposed corresponding to the diagonal corners of the first wall 31a respectively. Therefore, when the battery 10 is tilted, the electrolyte solution leaking from the battery cell 30 can flow into the corresponding first groove 50a, thereby further improving the smoothness of the electrolyte solution flowing into the first groove 50a, and reducing the probability of the electrolyte solution electrically connecting two adjacent busbars 40.

In some embodiments, at least four first grooves 50a are disposed corresponding to the first wall 31a. The at least four first grooves 50a include four first grooves 50a disposed corresponding to two pairs of diagonal corners of the first wall 31a respectively.

In this way, the four first grooves 50a are disposed along two diagonal lines across from each other with respect to the first direction M and the second direction N. Therefore, two of the first grooves 50a are disposed opposite to two diagonal positions of the first wall 31a respectively, and the other two of the first grooves 50a are disposed opposite to the other two diagonal positions of the first wall 31a respectively. In other words, the four first grooves 50a are disposed opposite to the four diagonal positions of the first wall 31a respectively.

In this way, when the battery 10 is tilted, such an arrangement further improves the smoothness of the electrolyte solution flowing into the first groove 50a, and further reduces the probability of the electrolyte solution electrically connecting two adjacent busbars 40.

In some embodiments, the first groove 50a includes a first drain hole 50b. The first drain hole 50b runs through a bottom wall of the first groove 50a.

The bottom wall of the first groove 50a is a wall portion of the first groove 50a, the wall portion being opposite to the first wall 31a along the thickness direction O. The first drain hole 50b runs through the bottom wall of the first groove 50a, so that the electrolyte solution leaking from the battery cell 30 can flow out through the first drain hole 50b after flowing into the first groove 50a, and the electrolyte solution can be prevented from accumulating in the first groove 50a.

Optionally, each first groove 50a may be provided with a first drain hole 50b, or a part of the first grooves 50a may be provided with a first drain hole 50b. One first groove 50a may be provided with one, two, or more first drain holes 50b. A plurality of first drain holes 50b of the one first groove 50a may be spaced apart.

Understandably, the electrolyte solution in the first groove 50a can be expelled promptly through the first drain hole 50b, thereby further reducing the risk that the electrolyte solution electrically connects two adjacent busbars 40 and causes a high-voltage short circuit inside the battery 10.

Figure 16:
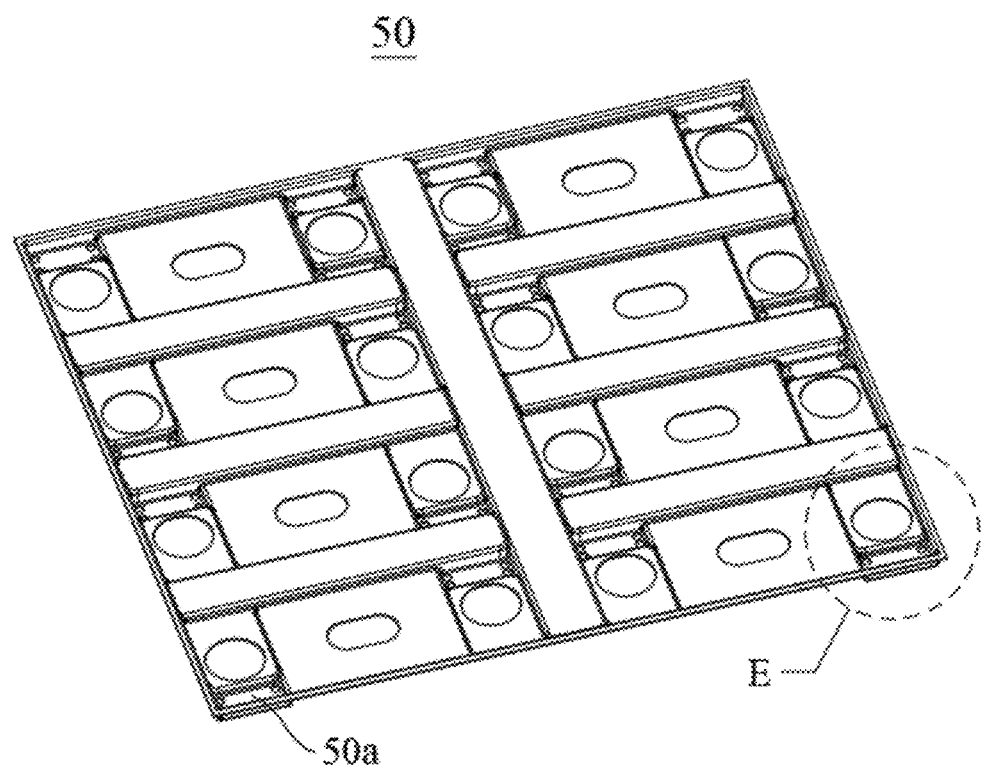
FIG. 16 is a schematic structural diagram of an insulation piece in a battery according to an embodiment of this application.
Figure 17:
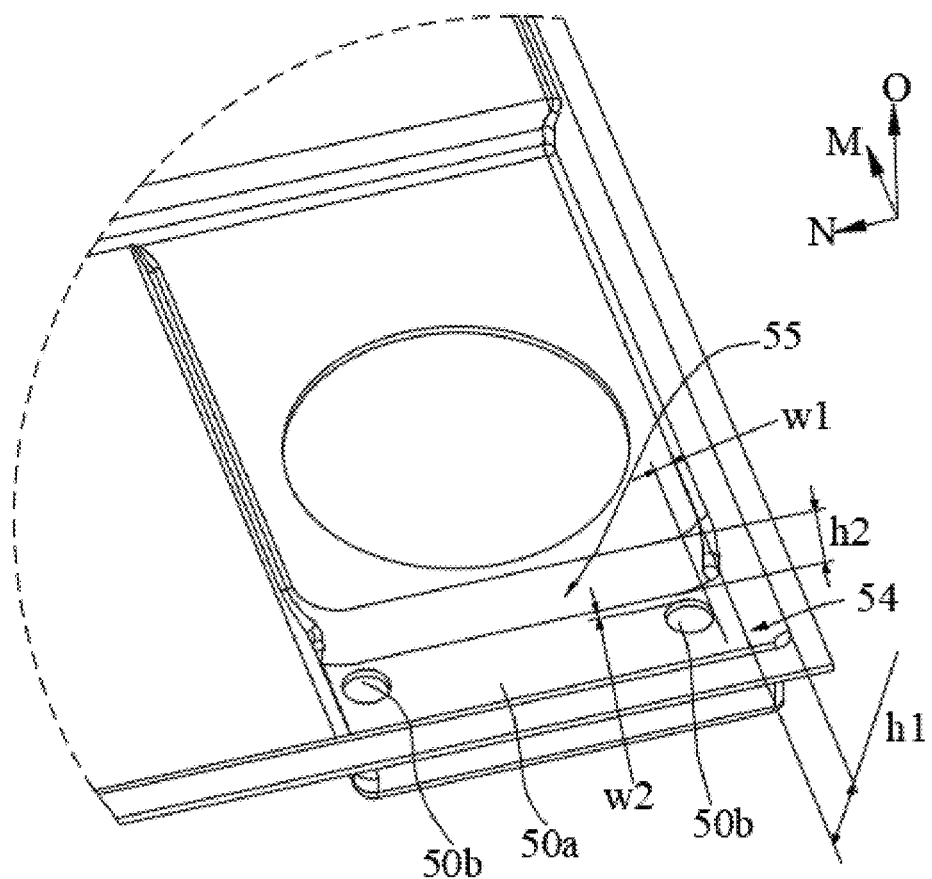
FIG. 17 is a close-up view of a part E shown in FIG. 16. The drawings are not drawn to scale.

As shown in FIG. 16 and FIG. 17, in some embodiments, the first groove 50a includes a first sidewall 54 extending along a first direction M and a second sidewall 55 extending along a second direction N. The first sidewall 54 is connected to the second sidewall 55. Both the first sidewall 54 and the second sidewall 55 are connected to an outer periphery of the bottom wall of the first groove 50a. The dimension of the first sidewall 54 along a thickness direction O of the first wall 31a is $h_1$, and a minimum distance between an edge of the first drain hole 50b and the first sidewall 54 along the second direction N is $w_1$, satisfying: $w_1 \leq 5.67h_1$. The first direction M, the second direction N, and the thickness direction O of the first wall 31a intersect each other. As an example, the first direction M, the second direction N, and the thickness direction O of the first wall 31a may be perpendicular to each other.

With the minimum distance satisfying $w_1 \leq 5.67h_1$, $w_1/h_1$ may be 0.1, 0.5, 0.6, 0.8, 1, 1.5, 1.8, 2, 2.2, 2.5, 2.8, 3, 3.2, 3.5, 3.8, 4, 4.2, 4.5, 5, 5.5, 5.6, 5.67, or the like.

Understandably, during the operation of the battery 10, the battery does not always work in a horizontal posture, but may tilt while working. When the battery 10 tilts along the second direction N, the first groove 50a also tilts along the second direction N. The electrolyte solution in the first groove 50a accumulates at the lowest corner of the first groove 50a under the action of gravity. In this way, it is necessary to ensure that the electrolyte solution can still be expelled through the first drain hole 50b when the battery 10 tilts.

When the battery 10 tilts at an angle of 10° along the second direction N, in order to expel the electrolyte solution in the first groove 50a promptly through the first drain hole 50b, the maximum allowable value of $w_1$ is $5.67h_1$. The smaller the tilt angle of the battery 10 along the second direction N, the larger the maximum allowable value of $w_1$. Therefore, the minimum distance is set to satisfy $w_1 \leq 5.67h_1$. When the battery 10 tilts along the second direction N, this setting is conducive to ensuring that the electrolyte solution in the first groove 50a is expelled promptly through the first drain hole 50b, thereby further improving the reliability of the battery 10.

As an example, when the battery 10 is applied in a vehicle, the second direction N may correspond to the width direction of the vehicle. Based on the relevant design specifications of the vehicle and the actual operating conditions of the vehicle, the maximum allowable widthwise tilt angle of the vehicle inclined forward or backward is 10°. When the vehicle tilts widthwise at an angle of 10°, in order to expel the electrolyte solution in the first groove 50a promptly through the first drain hole 50b, the maximum allowable value of $w_1$ is $5.67h_1$. The smaller the widthwise tilt angle of the vehicle, the larger the maximum allowable value of $w_1$. Therefore, the minimum distance is set to satisfy $w_1 \leq 5.67h_1$. When the vehicle tilts widthwise during operation, this setting is conducive to ensuring that the electrolyte solution in the first groove 50a is expelled promptly through the first drain hole 50b, thereby further improving the reliability of the vehicle.

Therefore, the minimum distance is set to satisfy $w_1 \leq 5.67h_1$. When the battery 10 tilts at an angle of 10° or less along the second direction N, this setting ensures that the electrolyte solution leaking from the battery cell 30 can still be expelled through the first drain hole 50b.

Still referring to FIG. 16 and FIG. 17, in some embodiments, the dimension of the second sidewall 55 along the thickness direction of the first wall is $h_2$, and a minimum distance between the edge of the first drain hole 50b and the second sidewall 55 along the first direction M is $w_2$, satisfying: $w_2 \leq 2.74h_2$, where the first direction M, the second direction N, and the thickness direction O of the first wall 31a intersect each other.

With the minimum distance satisfying $w_2 \leq 2.74h_2$, $w_2/h_2$ may be 0.1, 0.5, 0.6, 0.8, 1, 1.5, 1.8, 2, 2.2, 2.5, 2.6, 2.7, 2.74, or the like.

During operation, the battery 10 may also tilt along the first direction M. When the battery 10 tilts along the first direction M, the first groove 50a also tilts along the first direction M. The electrolyte solution in the first groove 50a accumulates at the lowest corner of the first groove 50a under the action of gravity. In this way, it is necessary to ensure that the electrolyte solution can still be expelled through the first drain hole 50b when the battery 10 tilts.

When the battery 10 tilts at an angle of 20° along the first direction M, in order to expel the electrolyte solution in the first groove 50a promptly through the first drain hole 50b, the maximum allowable value of $w_2$ is $2.74h_2$. The smaller the tilt angle of the battery 10 along the first direction M, the larger the maximum allowable value of $w_2$. Therefore, the minimum distance is set to satisfy $w_2 \leq 2.74h_2$. When the battery 10 tilts along the first direction M, this setting is conducive to ensuring that the electrolyte solution in the first groove 50a is expelled promptly through the first drain hole 50b, thereby further improving the reliability of the battery 10.

As an example, when the battery 10 is applied in a vehicle, the first direction M may correspond to the length direction of the vehicle, that is, the travel direction of the vehicle. The thickness direction of the first wall 31a corresponds to the height direction of the vehicle. Based on the relevant design specifications of the vehicle and the actual operating conditions of the vehicle, the maximum allowable lengthwise tilt angle of the vehicle is 20°. When the vehicle tilts lengthwise at an angle of 20°, in order to expel the electrolyte solution in the first groove 50a promptly through the first drain hole 50b, the maximum allowable value of $w_2$ is $2.74h_2$. The smaller the lengthwise tilt angle of the vehicle, the larger the maximum allowable value of $w_2$. Therefore, the minimum distance is set to satisfy $w_2 \leq 2.74h_2$. When the vehicle tilts lengthwise during operation, this setting is conducive to ensuring that the electrolyte solution in the first groove 50a is expelled promptly through the first drain hole 50b, thereby further improving the reliability of the vehicle.

Therefore, the minimum distance is set to satisfy $w_2 \leq 2.74h_2$. When the battery 10 tilts at an angle of 20° or less along the first direction M, this setting ensures that the electrolyte solution leaking from the battery cell 30 can still be expelled through the first drain hole 50b.

In some embodiments, when the battery 10 is applied in a vehicle, the first direction M of the battery 10 may correspond to the length direction of the vehicle, the second direction N of the battery 10 may correspond to the width direction of the vehicle, the thickness direction O of the battery 10 may correspond to the height direction of the vehicle, $w_1$ and $h_1$ are set to satisfy: $w_1 \leq 5.67h_1$, and $w_2$ and $h_2$ are set to satisfy: $w_2 \leq 2.74h_2$. In this way, during movement of the vehicle, whether the vehicle tilts lengthwise at an angle of 20° or less or tilts widthwise at an angle of 10° or less, the electrolyte solution in the first groove 50a can be expelled through the first drain hole 50b, thereby improving the reliability of the vehicle.

Figure 6:
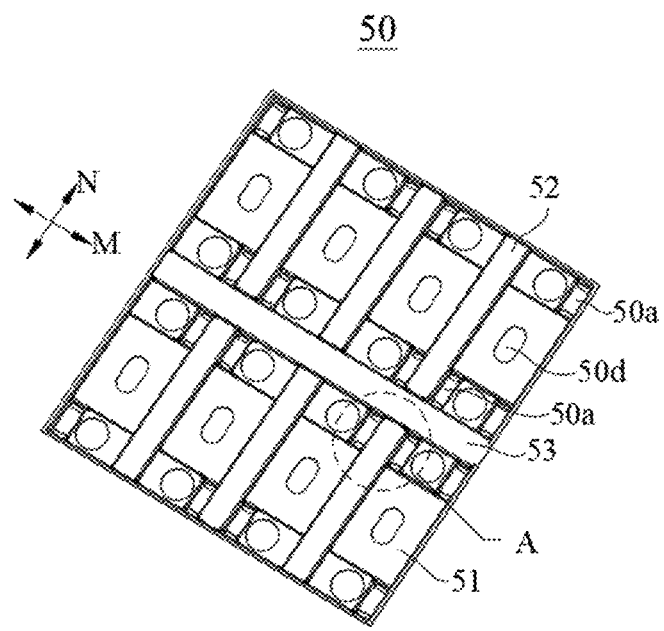
FIG. 6 is a schematic structural diagram of an insulation piece in a battery according to an embodiment of this application.
Figure 7:
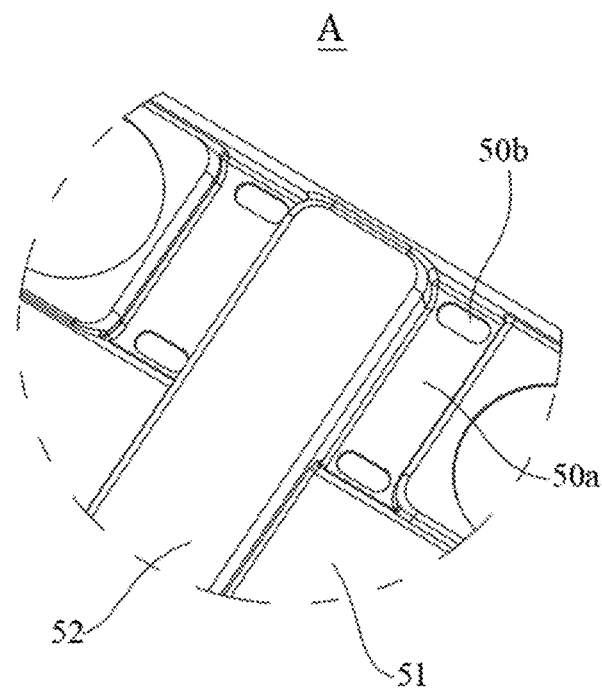
FIG. 7 is a close-up view of a part A shown in FIG. 6.

As shown in FIG. 6 and FIG. 7, in some embodiments, the first groove 50a includes a plurality of first drain holes 50b. The plurality of first drain holes 50b are spaced apart.

The first groove 50a includes a plurality of first drain holes 50b, thereby being conducive to increasing the speed of expelling the electrolyte solution in the first groove 50a. When the bottom wall of the first groove 50a tilts relative to the horizontal direction, the electrolyte solution can be expelled through the first drain hole 50b that is located at a relatively low position after tilting, thereby making it more convenient to expel the electrolyte solution in the first groove 50a promptly, and reducing the risk of the electrolyte solution electrically connecting two adjacent busbars 40.

In some embodiments, at least one first drain hole 50b is disposed at a corner of the first groove 50a.

The corner of the first groove 50a may be a position, close to an intersection between any two intersecting sidewalls, on the bottom wall of the first groove 50a. The first drain hole 50b may be located at any corner of the first groove 50a.

With at least one first drain hole 50b positioned at the corner of the first groove 50a, when the battery 10 tilts in a corresponding direction, the first drain hole 50b is located at a relatively low position of the first groove 50a, thereby making it convenient to expel the electrolyte solution in the first groove 50a promptly through the first drain hole 50b.

As an example, at least two first drain holes 50b may be disposed at two opposite corners of the first groove 50a respectively. In this way, when the battery 10 tilts, the electrolyte solution in the first groove 50a can be expelled conveniently in time.

Figure 10:
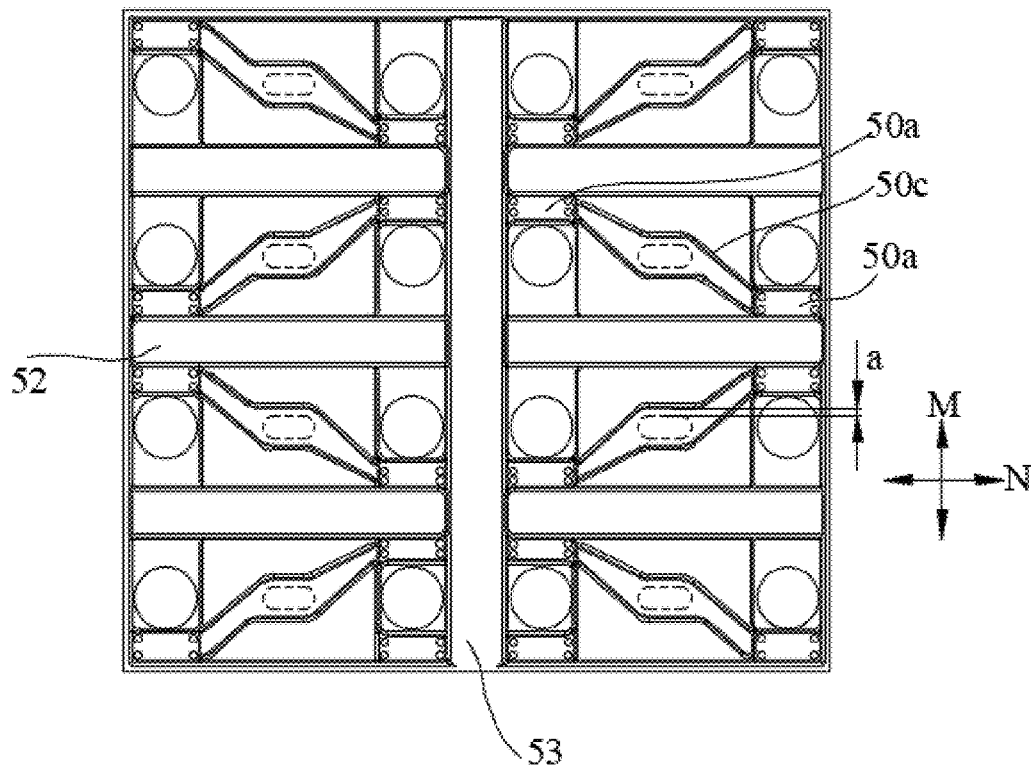
FIG. 10 is a schematic structural diagram of still another insulation piece in a battery according to an embodiment of this application.
Figure 11:
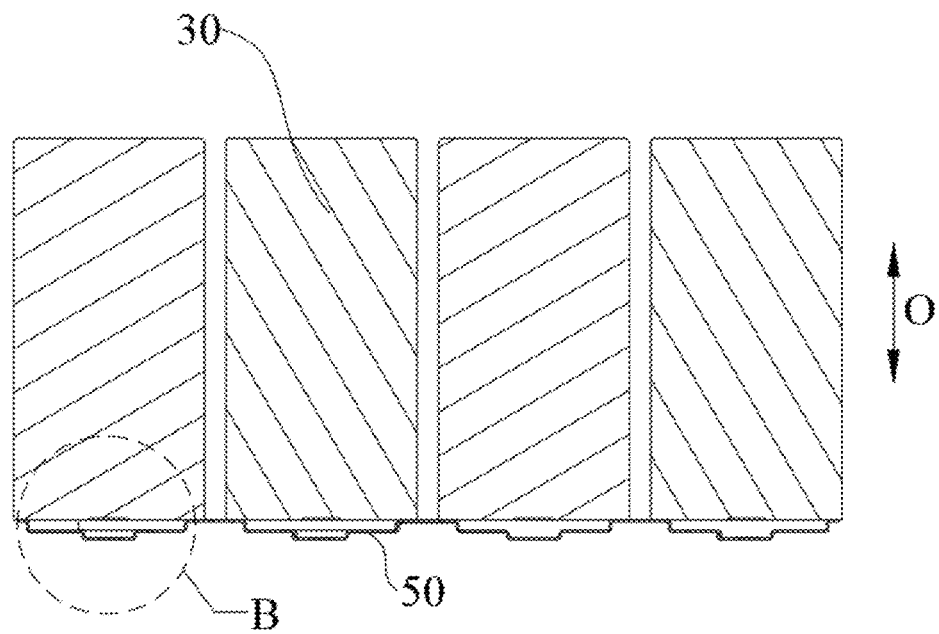
FIG. 11 is a cross-sectional view of a partial structure in a battery according to an embodiment of this application.
Figure 12:
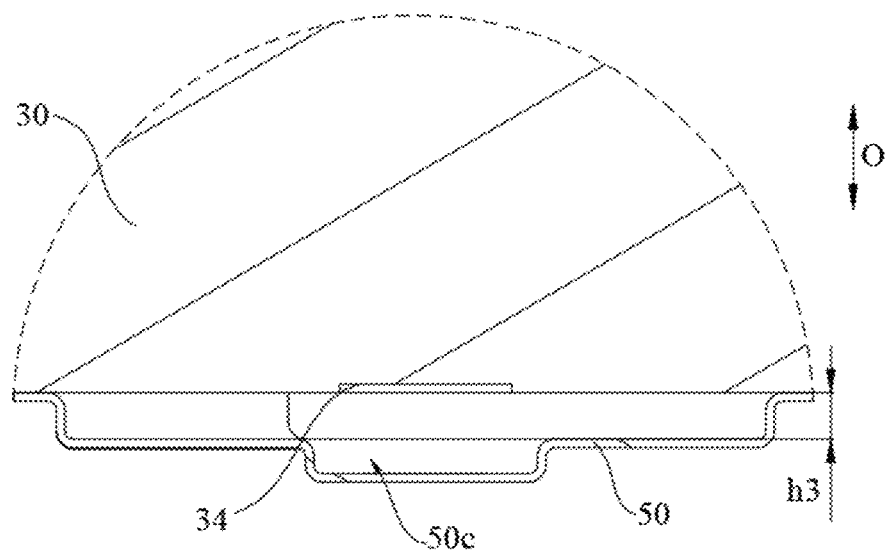
FIG. 12 is a close-up view of a part B shown in FIG. 11.

As shown in FIG. 10, in some embodiments, the insulation piece 50 further includes a guide groove 50c, and the guide groove 50c is connected to the first groove 50a.

Optionally, the insulation piece 50 may include one, two, three, or more first grooves 50a. The guide groove 50c is connected to one first groove 50a, or connected to at least two first grooves 50a among a plurality of first grooves 50a.

In this way, when dripping onto the insulation piece 50, the electrolyte solution leaking from the battery cell 30 can flow into the guide groove 50c first, and then flow into the first groove 50a through the guide groove 50c. In this way, it is convenient for the electrolyte solution leaking from the battery cell 30 to flow into the first groove 50a more promptly.

As shown in FIG. 4 and FIG. 10, in some embodiments, the battery cell 30 further includes a pressure relief mechanism 34. The pressure relief mechanism 34 is disposed on the first wall 31a. An orthographic projection of the pressure relief mechanism 34 on the insulation piece 50 along a thickness direction O of the first wall 31a at least partially lies within the guide groove 50c.

The pressure relief mechanism 34 may be configured to burst when the pressure inside the battery cell 30 reaches a specified threshold, and allow the gas to be expelled out of the battery cell 30, thereby reducing the risk of explosion of the battery cell 30. If the pressure relief mechanism 34 is disposed on the first wall 31a, there is also a risk of electrolyte solution leakage at the joint between the pressure relief mechanism 34 and the first wall 31a.

The orthographic projection of the pressure relief mechanism 34 on the insulation piece 50 along the thickness direction O of the first wall 31a at least partially lies within the guide groove 50c, and as an example, the orthographic projection of the pressure relief mechanism 34 on the insulation piece 50 along the thickness direction O of the first wall 31a is set to fully lie within the guide groove 50c. In this way, at least a part of the electrolyte solution leaking through the pressure relief mechanism 34 drips into the guide groove 50c directly under the action of gravity, and can flow into the first groove 50a through the guide groove 50c.

Such an arrangement makes it convenient for the electrolyte solution leaking from the pressure relief mechanism 34 to flow into the first groove 50a promptly, thereby further reducing the probability that the electrolyte solution leaking from the battery cell 30 electrically connects two adjacent busbars 40.

In some embodiments, along the thickness direction O of the first wall 31a, the orthographic projection of the pressure relief mechanism 34 on the insulation piece 50 lies within the guide groove 50c. A minimum distance between an edge of the orthographic projection of the pressure relief mechanism 34 on the insulation piece 50 and a sidewall of the guide groove 50c is a, and, along the thickness direction O of the first wall 31a, a minimum distance between the pressure relief mechanism 34 and the guide groove 50c is $h_3$, satisfying: $a \geq 0.36 h_3$. Further, $h_3$ is a minimum distance between a surface, close to the guide groove 50c, of the pressure relief mechanism 34 and a surface, close to the pressure relief mechanism 34, of the guide groove 50c along the thickness direction O of the first wall 31a.

With the minimum distance satisfying $a \geq 0.36 h_3$, $a/h_3$ may be 0.36, 0.4, 0.5, 0.6, 0.7, 0.8, 1, 1.5, 2, or the like.

The battery may tilt during operation. When the battery tilts at 20°, in order to ensure that the electrolyte solution leaking from the pressure relief mechanism 34 can still drip into the guide groove 50c, the minimum value of a is $0.36 h_3$. The smaller the tilt angle of the battery 10, the smaller the required value of a.

Therefore, the value of a is set to satisfy $a \geq 0.36 h_3$. In this way, when the battery 10 tilts by less than 20°, this setting increases the probability that the electrolyte solution leaking from the pressure relief mechanism 34 drips into the guide groove 50c, thereby further improving the reliability of the battery 10.

In some embodiments, the guide groove 50c is recessed along a direction facing away from the first wall 31a. Along the thickness direction O of the first wall 31a, the dimension of the guide groove 50c is less than or equal to the dimension of the first groove 50a.

If the guide groove 50c is set to be recessed along the direction facing away from the first wall 31a, the recessing direction of the guide groove 50c is the same as the recessing direction of the first groove 50a. If, along the thickness direction O of the first wall 31a, the dimension of the guide groove 50c is set to be less than or equal to the dimension of the first groove 50a, then the depth by which the guide groove 50c is recessed along the thickness direction O of the first wall 31a is less than or equal to the depth by which the first groove 50a is recessed along the thickness direction O. When the electrode terminal 33 of the battery cell 30 is disposed downward along the gravity direction, the bottom wall of the first groove 50a is lower than the bottom wall of the guide groove 50c, thereby making it convenient for the electrolyte solution in the guide groove 50c to flow into the first groove 50a more smoothly. In an embodiment in which a first drain hole 50b is disposed on the bottom wall of the first groove 50a, the electrolyte solution can be expelled conveniently in time.

In some embodiments, the first wall 31a includes an injection port 35. The injection port 35 is configured to inject an electrolyte solution into the shell 31. Along a thickness direction O of the first wall 31a, an orthographic projection of the injection port 35 on the insulation piece 50 at least partially lies within the guide groove 50c.

The injection port 35 is configured to inject the electrolyte solution into the battery cell 30. After the electrolyte solution is injected, the injection port 35 is sealed. However, with the battery 10 being used over time, the injection port 35 is still at risk of electrolyte solution leakage.

Along the thickness direction O of the first wall 31a, the orthographic projection of the injection port 35 on the insulation piece 50 at least partially lies within the guide groove 50c, and therefore, the orthographic projection of the injection port 35 on the insulation piece 50 along the thickness direction O partially lies within the guide groove 50c, or, the orthographic projection of the injection port 35 along the thickness direction O fully lies within the guide groove 50c.

In this way, when the electrode terminal 33 of the battery cell 30 is disposed downward along the gravity direction, at least a part of the electrolyte solution leaking through the injection port 35 drips into the guide groove 50c, and then flows into the first groove 50a through the guide groove 50c. In this way, the electrolyte solution leaking through the injection port 35 can flow into the first groove 50a promptly through the guide groove 50c.

Figure 8:
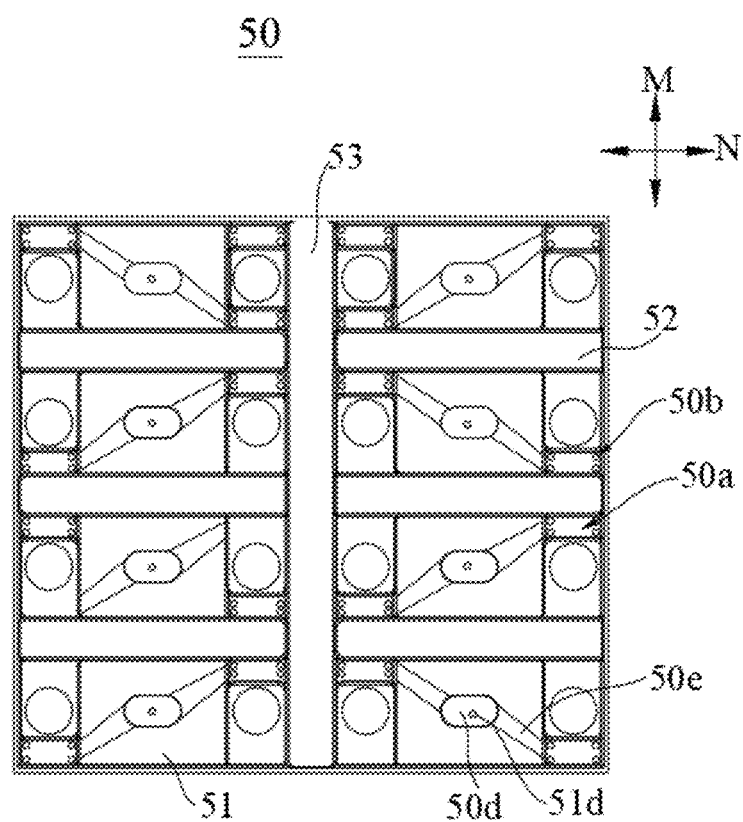
FIG. 8 is a schematic structural diagram of another insulation piece in a battery according to an embodiment of this application.
Figure 9:
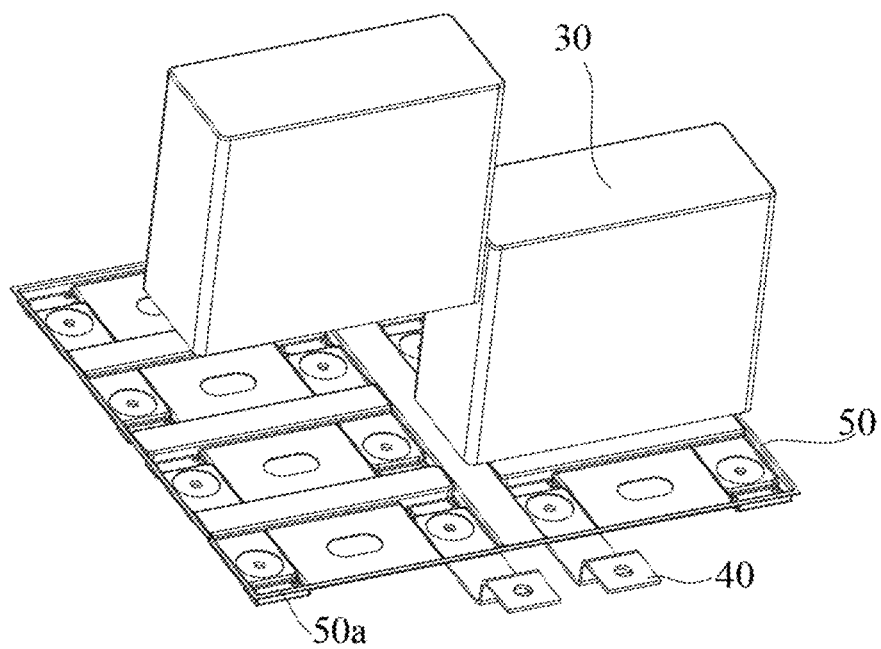
FIG. 9 is a schematic exploded view of a battery with some structures omitted according to an embodiment of this application.

As shown in FIG. 4, FIG. 8, and FIG. 9, in some embodiments, the battery cell 30 further includes a pressure relief mechanism 34. The pressure relief mechanism 34 is disposed on the first wall 31a. The insulation piece 50 includes a second groove 50d recessed along a direction facing away from the first wall 31a. The orthographic projection of the pressure relief mechanism 34 on the insulation piece 50 along the thickness direction O of the first wall 31a at least partially lies within the second groove 50d.

The orthographic projection of the pressure relief mechanism 34 on the insulation piece 50 along the thickness direction O of the first wall 31a at least partially lies within the second groove 50d, and therefore, the orthographic projection of the pressure relief mechanism 34 along the thickness direction O may be set to partially lie within the second groove 50d, or, the orthographic projection of the pressure relief mechanism 34 along the thickness direction O fully lies within the second groove 50d.

In this way, the electrolyte solution leaking from the battery cell 30 through the pressure relief mechanism 34 at least partially flows into the second groove 50d directly and is stored in the second groove 50d, thereby further reducing the risk that the electrolyte solution leaking from the battery cell 30 electrically connects two adjacent busbars 40, and improving the reliability of the battery 10.

Referring to FIG. 8, in some embodiments, the second groove 50d includes a second drain hole 51d. The second drain hole 51d runs through a bottom wall of the second groove 50d.

The bottom wall of the second groove 50*d* is a wall portion of the second groove 50*d*, the wall portion being disposed opposite to the first wall 31*a* along the thickness direction O. The second drain hole 51*d* runs through the bottom wall of the second groove 50*d*, so that the electrolyte solution leaking from the battery cell 30 can flow out through the second drain hole 51*d* after flowing into the second groove 50*d*, and the electrolyte solution can be prevented from accumulating in the second groove 50*d*.

Optionally, each second groove 50*d* is provided with a second drain hole 51*d*, or, a part of the second grooves 50*d* are provided with a second drain hole 51*d*. One second groove 50*d* may be provided with one, two, or more second drain holes 51*d*. A plurality of second drain holes 51*d* of one second groove 50*d* may be spaced apart.

Understandably, the second drain hole 51*d* is disposed to expel the electrolyte solution in the second groove 50*d* promptly, thereby further reducing the risk that the electrolyte solution electrically connects two adjacent busbars 40 and causes a high-voltage short circuit inside the battery 10.

Still referring to FIG. 9, in some embodiments, the insulation piece 50 further includes a communicating channel 50*e*. The communicating channel 50*e* connects the first groove 50*a* and the second groove 50*d*.

Understandably, the depths of the first groove 50*a* and the second groove 50*d* along the thickness direction O may be set as required, so as to control the flow direction of the electrolyte solution. As an example, the depth of the first groove 50*a* along the thickness direction O may be set to be greater than the dimension of the second groove 50*d* along the thickness direction O. In this way, the electrolyte solution in the second groove 50*d* flows into the first groove 50*a* through the communicating channel 50*e*. The electrolyte solution is stored into the second groove 50*d* only when the liquid level of the first groove 50*a* is flush with the bottom wall of the second groove 50*d*.

The communicating channel 50*e* connects the first groove 50*a* and the second groove 50*d*, and enables reciprocal flow of the electrolyte solution between the first groove 50*a* and the second groove 50*d*, so as to balance the storage amount of electrolyte solution between the first groove 50*a* and the second groove 50*d*, and reduce the risk that the electrolyte solution in one of the first groove 50*a* or the second groove 50*d* overflows while the electrolyte solution storage amount in the other groove is relatively small. In this way, the first groove 50*a* and the second groove 50*d* can accommodate more electrolyte solution, thereby further reducing the risk of the electrolyte solution electrically connecting two adjacent busbars 40.

As shown in FIG. 6, FIG. 8, and FIG. 10, in some embodiments, the battery 10 includes a plurality of battery cells 30. The plurality of battery cells 30 are arranged along a first direction M. The insulation piece 50 includes at least one first blocking protrusion 52. The first blocking protrusion 52 extends along a second direction N and is located on one side, close to the first wall 31*a*, of the insulation piece 50. The second direction N intersects the first direction M. As an example, the second direction N is perpendicular to the first direction M. The first blocking protrusion 52 is located between two first grooves 50*a* corresponding to the first walls 31*a* of two battery cells 30 adjacent to each other along the first direction M.

The first blocking protrusion 52 protrudes toward the battery cell 30, and the first blocking protrusion 52 may be formed by a process such as injection molding and stamping. The plurality of battery cells 30 are arranged along at least the first direction M, and therefore, the plurality of battery cells 30 are arranged along the first direction M alone, or, the plurality of battery cells 30 are also arranged along another direction such as the second direction N at the same time.

The first blocking protrusion 52 extends along the second direction N, and therefore, the first blocking protrusion 52 can prevent the electrolyte solution from flowing between two adjacent first grooves 50*a* along the first direction M.

In this way, once the electrolyte solution leaking from one battery cell 30 drips onto the insulation piece 50, as blocked by the first blocking protrusion 52, it is difficult for the leaked electrolyte solution to flow to at least a part of the region corresponding to the insulation piece 50 on the other battery cell 30 that is adjacent, thereby further reducing the probability that the electrolyte solution electrically connects two adjacent busbars 40 and causes an internal short circuit of the battery 10.

Still referring to FIG. 6, FIG. 8, and FIG. 10, in some embodiments, a plurality of the battery cells 30 are arranged in a matrix along the first direction M and the second direction N. The insulation piece 50 includes at least one second blocking protrusion 53. The second blocking protrusion 53 extends along the first direction M and is located on one side, close to the first wall 31*a*, of the insulation piece 50. The second blocking protrusion 53 intersects the first blocking protrusion 52. The second blocking protrusion 53 is located between two first grooves 50*a* corresponding to the first walls 31*a* of two battery cells 30 adjacent to each other along the second direction N.

In this way, a plurality of battery cells 30 are arranged along the first direction M and the second direction N. A second blocking protrusion 53 may be disposed between the first grooves 50*a* corresponding to any and all pairs of battery cells 30 in which one battery cell is adjacent to the other along the second direction N, or, a second blocking protrusion 53 may be disposed between the first grooves 50*a* corresponding to some pairs of battery cells 30 in which one battery cell is adjacent to the other along the second direction N. The first blocking protrusion 52 intersects the second blocking protrusion 53, thereby forming a limited space. The electrolyte solution leaking from the corresponding battery cell 30 flows only within the corresponding limited space, and flows into the corresponding first groove 50*a*, but without flowing into the first groove 50*a* corresponding to the adjacent battery cell 30.

Therefore, the insulation piece 50 is provided with a second blocking protrusion 53, and the second blocking protrusion 53 is positioned between the first grooves 50*a* corresponding to the first walls 31*a* of two battery cells 10 adjacent to each other along the second direction N. In this way, the second blocking protrusion 53 can serve to limit the flow of electrolyte solution along the second direction N, thereby further reducing the probability that the electrolyte solution leaking from the battery cell 30 electrically connects two adjacent busbars 40, and further improving the reliability of the battery 10.

Figure 13:
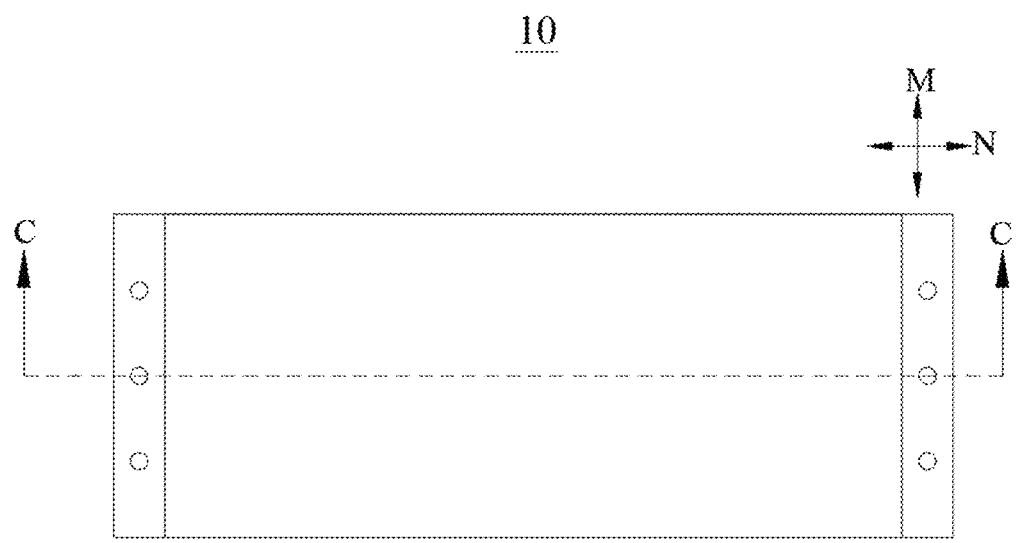
FIG. 13 is a front view of a battery according to an embodiment of this application.
Figure 14:
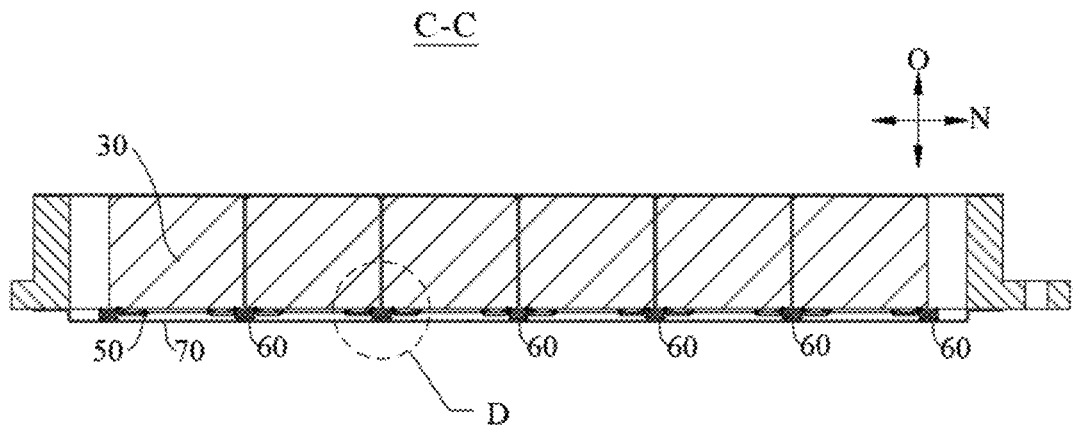
FIG. 14 is a cross-sectional view of a structure sectioned along a C-C line shown in FIG. 13.
Figure 15:
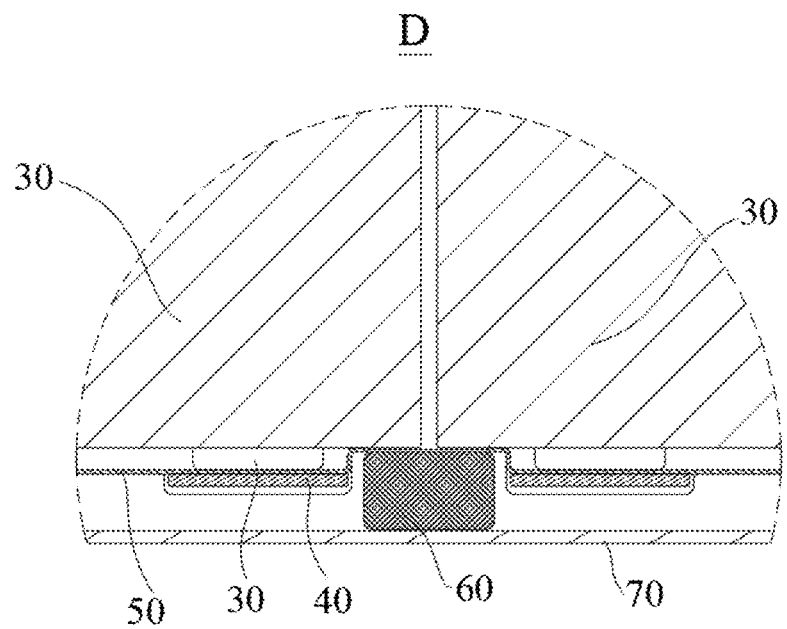
FIG. 15 is a close-up view of a part D shown in FIG. 14.

As shown in FIG. 13, FIG. 14, and FIG. 15, in some embodiments, the battery 10 includes a plurality of battery cells 30. The plurality of battery cells 30 are arranged in a matrix along a first direction M and a second direction N. The battery 10 further includes at least one insulation spacer 60. The insulation spacer 60 extends along the first direction M. The insulation spacer 60 is disposed between two busbars 40 adjacent to each other along the second direction N.

The insulation spacer 60 is disposed between two busbars 40 adjacent to each other along the second direction N, and therefore, the insulation spacer 60 can implement insulative isolation between the two adjacent busbars 40 that are adjacent along the second direction N, thereby increasing a creepage distance of the two adjacent busbars 40, reducing the risk of electrical connection between the two busbars, and improving the reliability of the battery.

Still referring to FIG. 13, FIG. 14, and FIG. 15, in some embodiments, the insulation spacer 60 abuts the first wall 31 of the battery cell 30 and/or the insulation piece 50.

Optionally, the insulation spacer 60 abuts the first wall 31 of the battery cell 30 alone, or, the insulation spacer 60 abuts the insulation piece 50 alone; or, a part of one insulation spacer 60 abuts the first wall 31, and another part of the insulation spacer abuts the insulation piece 50.

The insulation spacer 60 abuts the first wall 31 or the insulation piece 50, and therefore, the insulation spacer 60 may be connected to the first wall 31 by bonding, or, the insulation spacer 60 may be connected to the insulation piece 50 by bonding. Alternatively, the insulation spacer 60 is just in contact with the first wall or insulation piece under the action of external pressure.

In an embodiment in which the insulation piece 50 is provided with a second blocking protrusion 53, the insulation spacer 60 may be arranged to abut one side of the second blocking protrusion 53, the side facing away from the first wall 51a.

The insulation spacer 60 arranged to abut at least one of the first wall 31 or the insulation piece 50 is conducive to improving the structural compactness of the battery 10, and the insulation spacer 60 can further improve the insulation effect between two adjacent busbars 40.

Still referring to FIG. 13, FIG. 14, and FIG. 15, in some embodiments, the insulation spacer 60 abuts the first walls 31a of two battery cells 30 adjacent to each other along the second direction N.

In this way, the insulation spacer 60 can implement the insulative isolation of the structures such as the electrode terminals 33 between two adjacent battery cells 30, reduce the amount of the insulation spacer 60 that needs to be used, and reduce the weight and production cost of the battery 10.

Still referring to FIG. 13, FIG. 14, and FIG. 15, in some embodiments, the battery further includes a protection piece 70. The protection piece 70 is disposed on one side, facing away from the battery cell 30, of the insulation spacer 60. The insulation spacer 60 abuts the protection piece 70.

The protection piece 70 may be in any shape. As an example, the protection piece 70 may be in a plate shape. Optionally, the protection piece 70 may be formed as a part of a box of the battery 10. For example, the protection piece 70 is a bottom plate of the box of the battery 10.

The insulation spacer 60 may abut between the first wall 31a of the battery cell 30 and the protection piece 70, or, the insulation spacer 60 may abut between the insulation piece 50 and the protection piece 70. Optionally, the insulation spacer 60 may be bonded to the protection piece 70. Such an arrangement can increase the electrical clearance and creepage distance inside the battery 10, thereby further improving the reliability of the battery 10. The insulation spacer 60 can also increase the overall structural strength of the battery 10.

Still referring to FIG. 13, FIG. 14, and FIG. 15, in some embodiments, there is a clearance between the protection member 70 and the busbar 40.

The clearance between the protection piece 70 and the busbar 40 may be determined based on actual needs. When the protection piece is subjected to impact, vibration, or another load, the protection piece 70 can bear a specified amount of load and deform toward the busbar 40. The clearance designed between the protection piece 70 and the busbar 40 can be used as a deformation clearance space for the protection piece 70, thereby buffering the deformation of the protection piece 70 to some extent, reducing the risk that an external impact or vibration or another external load damages the busbar 40, and protecting the busbar 40 to some extent.

In some embodiments, the electrode terminal 33 of the battery cell 30 is disposed downward along a gravity direction.

The electrode terminal 33 is disposed downward along the gravity direction, and therefore, the electrode terminal 33 is located at the very bottom of the shell 31 of the battery cell 30 along the gravity direction, the insulation piece 50 is located below the battery cell 30 along the gravity direction, and the first groove 50a is also recessed downward along the gravity direction. In this way, the electrolyte solution leaking from the joint between the electrode terminal 33 and the first wall 31a drips onto the insulation piece 50 under the action of gravity, and flows into the first groove 50a. Therefore, such an arrangement makes it convenient for the electrolyte solution to flow into the first groove 50a promptly.

An embodiment of this application further provides an electrical device. The electrical device includes the battery 10 disclosed in any one of the above embodiments. The battery 10 is configured to provide electrical energy for the electrical device. An electrode terminal 33 of the battery cell 30 is disposed downward along a gravity direction.

The electrical device according to this embodiment of this application employs the battery 10 according to an embodiment of this application, and therefore, in a case that the electrolyte solution in the battery cell 30 is leaking, the first groove 50a can store the leaking electrolyte solution, thereby reducing the probability that the electrolyte solution electrically connects two adjacent busbars 40 inside the battery 10 and causes a high-voltage short circuit inside the battery 10, and improving the reliability of the electrical device.

An embodiment of this application provides a battery 10, including a battery cell 30, a busbar 40, an insulation piece 50, an insulation spacer 60, and a protection piece 70. The battery cell 30 includes a shell 31, an electrode terminal 33, and a pressure relief mechanism 34. The shell 31 includes a first wall 31a. The electrode terminal 33 and the pressure relief mechanism 34 are disposed on the first wall 31a. The electrode terminal 33 is disposed downward along a gravity direction. The busbar 40 is electrically connected to the electrode terminal 33. The insulation piece 50 is disposed on one side, facing the electrode terminal 33, of the busbar 40 and covers at least a part of the first wall 31a. The insulation piece 50 includes a first groove 50a recessed along a direction facing away from the first wall 31a. At least four first grooves 50a are disposed corresponding to the first wall 31a. The at least four first grooves 50a include four first grooves 50a disposed corresponding to two pairs of diagonal corners of the first wall 31a respectively. The first groove 50a includes a first drain hole 50b. The first drain hole 50b runs through a bottom wall of the first groove 50a. The first groove 50a includes a first sidewall 54 extending along a first direction M and a second sidewall 55 extending along a second direction N. The first sidewall 54 is contiguous to the second sidewall 55. Both the first sidewall 54 and the second sidewall 55 are connected to an outer periphery of the bottom wall of the first groove 50a. The dimension of the first sidewall 54 along a thickness direction O of the first wall 31a is $h_1$, and a minimum distance between an edge of the first drain hole 50b and the first sidewall 54 along the second direction N is $w_1$, satisfying: $w_1 \leq 5.67 h_1$. The dimension of the second sidewall 55 along the thickness direction O of the first wall 31$a$ is $h_2$, and a minimum distance between the edge of the first drain hole 50$b$ and the second sidewall 55 along the first direction M is $w_2$, satisfying: $w_2 \leq 2.74h_2$. The first direction M, the second direction N, and the thickness direction O of the first wall 31$a$ intersect each other. As an example, the first direction M, the second direction N, and the thickness direction O of the first wall 31$a$ are perpendicular to each other. The insulation piece 50 further includes a guide groove 50$c$. The guide groove 50$c$ is recessed along a direction facing away from the first wall 31$a$ and is connected to the first groove 50$a$. The orthographic projection of the pressure relief mechanism 34 on the insulation piece 50 along the thickness direction O of the first wall 31$a$ lies within the guide groove 50$c$. A minimum distance between an edge of the orthographic projection of the pressure relief mechanism 34 on the insulation piece 50 and a sidewall of the guide groove 50$c$ is a. Along the thickness direction O of the first wall 31$a$, a minimum distance between the pressure relief mechanism 34 and the guide groove 50$c$ is $h_3$, satisfying: $a \geq 0.36h_3$. Along the thickness direction O of the first wall 31$a$, the dimension of the guide groove 50$c$ is less than or equal to the dimension of the first groove 50$a$. The battery 10 includes a plurality of battery cells 30. The plurality of battery cells 30 are arranged in a matrix along a first direction M and a second direction N. The insulation piece 50 includes at least one first blocking protrusion 52 and at least one second blocking protrusion 53. The first blocking protrusion 52 extends along the second direction N and is located on one side, close to the first wall 31$a$, of the insulation piece 50. The first blocking protrusion 52 is located between two first grooves 50$a$ corresponding to the first walls 31$a$ of two battery cells 30 adjacent to each other along the first direction M. The second blocking protrusion 53 extends along the first direction M and is located on one side, close to the first wall 31$a$, of the insulation piece 50. The second blocking protrusion 53 intersects the first blocking protrusion 52. The second blocking protrusion 53 is located between two first grooves 50$a$ corresponding to the first walls 31$a$ of two battery cells 30 adjacent to each other along the second direction N. The insulation spacer 60 extends along the first direction M and is located between the two busbars 40 adjacent to each other along the second direction N. The insulation spacer 60 abuts the first walls 31$a$ of two battery cells 30 adjacent to each other along the second direction N. The protection piece 70 is disposed on one side, facing away from the battery cell 30, of the insulation spacer 60. The insulation spacer 60 abuts the protection piece 70. A clearance is formed between the protection piece 70 and the busbar 40.

The battery 10 according to this embodiment of this application can utilize the first groove 50$a$ to accommodate the electrolyte solution leaking from the battery cell 30. When the first wall 31$a$ of the battery cell 30 in the battery 10 is placed horizontally or tilted at an angle relative to the horizontal direction, the electrolyte solution can be expelled through the first drain hole 50$d$, thereby reducing the risk that the electrolyte solution electrically connects two adjacent busbars 40 and causes a high-voltage short circuit inside the battery 10. In addition, such an arrangement increases an electrical clearance and a creepage distance between two adjacent busbars 40, and improves the reliability of the battery 10.

It is hereby noted that to the extent that no conflict occurs, embodiments of this application and the features in the embodiments may be combined with each other.

Finally, it is hereby noted that the foregoing embodiments are merely intended to describe the technical solutions of this application but not to limit this application. Although this application has been described in detail with reference to the foregoing embodiments, a person of ordinary skill in the art understands that modifications may still be made to the technical solutions described in the foregoing embodiments, or equivalent replacements may still be made to some technical features in the technical solutions. Such modifications and replacements do not make the essence of the corresponding technical solutions depart from the spirit and scope of the technical solutions of the embodiments of this application.

What is claimed is:

1. A battery, comprising:
    a battery cell, comprising a shell and an electrode terminal, wherein the shell comprises a first wall, and the electrode terminal is disposed on the first wall;
    a busbar, electrically connected to the electrode terminal; and
    an insulation piece, disposed on one side, facing the electrode terminal, of the busbar and covering at least a part of the first wall,
    wherein the insulation piece includes a first groove recessed along a direction facing away from the first wall such that the first groove is open toward the first wall,
    wherein the insulation piece further includes a second wall facing the first wall, the second wall being adjacent to at least a part of the first groove, and the second wall being inclined toward the first groove from the first wall to form a flow path for an electrolyte solution from the first wall to the first groove.

2. The battery according to claim 1, wherein the battery comprises a plurality of the battery cells, the insulation piece is provided with a plurality of the first grooves, and the first wall of each battery cell is disposed opposite to at least one first groove.

3. The battery according to claim 1, wherein at least two first grooves are disposed corresponding to the first wall, and the at least two first grooves comprise two first grooves disposed corresponding to diagonal corners of the first wall respectively.

4. The battery according to claim 3, wherein at least four first grooves are disposed corresponding to the first wall, and the at least four first grooves comprise four first grooves disposed corresponding to two pairs of diagonal corners of the first wall respectively.

5. The battery according to claim 1, wherein the first groove comprises a first drain hole, and the first drain hole runs through a bottom wall of the first groove.

6. The battery according to claim 5, wherein the first groove comprises a first sidewall extending along a first direction and a second sidewall extending along a second direction, the first sidewall is connected to the second sidewall, and both the first sidewall and the second sidewall are connected to an outer periphery of the bottom wall of the first groove;
    a dimension of the first sidewall along a thickness direction of the first wall is $h_1$, and a minimum distance between an edge of the first drain hole and the first sidewall along the second direction is $w_1$, satisfying: $w_1 \leq 5.67h_1$; and/or, a dimension of the second sidewall along a thickness direction of the first wall is $h_2$, and a minimum distance between an edge of the first drain hole and the second sidewall along the first direction is $w_2$, satisfying: $w_2 \leq 2.74h_2$; and
    the first direction, the second direction, and the thickness direction of the first wall intersect each other.

7. The battery according to claim 5, wherein the first groove comprises a plurality of the first drain holes, and the plurality of the first drain holes are spaced apart.

8. The battery according to claim 5, wherein at least one first drain hole is disposed at a corner of the first groove.

9. The battery according to claim 1, wherein the insulation piece further comprises a guide groove, and the guide groove is connected to the first groove.

10. The battery according to claim 9, wherein the battery cell further comprises a pressure relief mechanism, the pressure relief mechanism is disposed on the first wall, and an orthographic projection of the pressure relief mechanism on the insulation piece along a thickness direction of the first wall at least partially lies within the guide groove.

11. The battery according to claim 10, wherein, along the thickness direction of the first wall, the orthographic projection of the pressure relief mechanism on the insulation piece lies within the guide groove, and a minimum distance between an edge of the orthographic projection of the pressure relief mechanism on the insulation piece and a sidewall of the guide groove is a, and, along the thickness direction of the first wall, a minimum distance between the pressure relief mechanism and the guide groove is $h_3$, satisfying: $a \geq 0.36 h_3$.

12. The battery according to claim 9, wherein the guide groove is recessed along a direction facing away from the first wall, and, along a thickness direction of the first wall, a dimension of the guide groove is less than or equal to a dimension of the first groove.

13. The battery according to claim 9, wherein the first wall comprises an injection port, the injection port is configured to inject an electrolyte solution into the shell, and, along a thickness direction of the first wall, an orthographic projection of the injection port on the insulation piece at least partially lies within the guide groove.

14. The battery according to claim 1, wherein the battery cell further comprises a pressure relief mechanism, the pressure relief mechanism is disposed on the first wall, the insulation piece comprises a second groove recessed along a direction facing away from the first wall, and an orthographic projection of the pressure relief mechanism on the insulation piece along a thickness direction of the first wall at least partially lies within the second groove;

wherein the second groove comprises a second drain hole, and the second drain hole runs through a bottom wall of the second groove; and wherein the insulation piece further comprises a communicating channel, and the communicating channel connects the first groove and the second groove.

15. The battery according to claim 1, wherein the battery comprises a plurality of the battery cells, the plurality of battery cells are arranged along a first direction, the insulation piece comprises at least one first blocking protrusion, the first blocking protrusion extends along a second direction and is located on one side, close to the first wall, of the insulation piece, the second direction intersects the first direction, and the first blocking protrusion is located between two first grooves corresponding to the first walls of two battery cells adjacent to each other along the first direction, wherein a plurality of the battery cells are arranged in a matrix along the first direction and the second direction, the insulation piece comprises at least one second blocking protrusion, the second blocking protrusion extends along the first direction and is located on one side, close to the first wall, of the insulation piece, the second blocking protrusion intersects the first blocking protrusion, and the second blocking protrusion is located between two first grooves corresponding to the first walls of two battery cells adjacent to each other along the second direction.

16. The battery according to claim 1, wherein the battery comprises a plurality of the battery cells, and the plurality of the battery cells are arranged in a matrix along a first direction and a second direction, and the first direction intersects the second direction; and the battery further comprises at least one insulation spacer, the insulation spacer extends along the first direction, and the insulation spacer is disposed between two busbars adjacent to each other along the second direction;

wherein the insulation spacer abuts the first wall of the battery cell and/or the insulation piece.

17. The battery according to claim 16, wherein the insulation spacer abuts the first walls of two battery cells adjacent to each other along the second direction.

18. The battery according to claim 16, wherein the battery further comprises a protection piece, the protection piece is disposed on one side, facing away from the battery cell, of the insulation spacer, and the insulation spacer abuts the protection piece;

wherein a clearance is provided between the protection piece and the busbar along a thickness direction of the first wall; and wherein the electrode terminal of the battery cell is disposed downward along a gravity direction.

19. An electrical device, comprising the battery according to claim 1, wherein the battery is configured to provide electrical energy, and the electrode terminal of the battery cell is disposed downward along a gravity direction.

* * * * *